(12) United States Patent
Jang et al.

(10) Patent No.: US 10,952,586 B2
(45) Date of Patent: Mar. 23, 2021

(54) CLEANER

(71) Applicant: LG ELECTRONICS INC., Seoul (KR)

(72) Inventors: Jaewon Jang, Seoul (KR); Jeongseop Park, Seoul (KR); Sungho Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 105 days.

(21) Appl. No.: 16/056,971

(22) Filed: Aug. 7, 2018

(65) Prior Publication Data

US 2019/0038106 A1 Feb. 7, 2019

(30) Foreign Application Priority Data

Aug. 7, 2017 (KR) .................. 10-2017-0099757

(51) Int. Cl.
*A47L 11/40* (2006.01)
*A47L 11/24* (2006.01)
(Continued)

(52) U.S. Cl.
CPC .......... *A47L 11/4061* (2013.01); *A47L 11/24* (2013.01); *A47L 11/282* (2013.01);
(Continued)

(58) Field of Classification Search
CPC .... A47L 11/4061; A47L 11/24; A47L 11/282; A47L 11/4069; A47L 11/4083; A47L 11/4072; A47L 11/4041; A47L 11/4013; A47L 11/4011; A47L 11/4005; A47L 2201/04; A47L 11/4088; A47L 11/292;
(Continued)

(56) References Cited

U.S. PATENT DOCUMENTS

| 2,988,762 A | 6/1961 | Babcock |
| 5,998,953 A | 12/1999 | Nakamura et al. |

(Continued)

FOREIGN PATENT DOCUMENTS

| EP | 1 762 165 | 3/2007 |
| EP | 3 138 459 | 3/2017 |

(Continued)

OTHER PUBLICATIONS

International Search Report dated Dec. 4, 2018 issued in PCT/KR2018/008928.
(Continued)

*Primary Examiner* — David Redding
(74) *Attorney, Agent, or Firm* — Ked & Associates, LLP

(57) ABSTRACT

A cleaner according to the present disclosure includes: a mop module which includes a pair of spin mops that contacts a floor while rotating clockwise or counterclockwise when viewed from a top and is left-right symmetric with a virtual central vertical plane; a collection module which includes at least one collection unit that collects foreign substances from the floor at a position spaced apart from the mop module in a forward and backward direction, forms a collection space which stores the collected foreign substances, and is left-right symmetric with respect to the central vertical plane; and a body that connects the mop module and the collection module.

20 Claims, 24 Drawing Sheets

(51) Int. Cl.
*A47L 11/282* (2006.01)
*G06T 7/70* (2017.01)

(52) U.S. Cl.
CPC ....... *A47L 11/4005* (2013.01); *A47L 11/4011* (2013.01); *A47L 11/4013* (2013.01); *A47L 11/4038* (2013.01); *A47L 11/4041* (2013.01); *A47L 11/4069* (2013.01); *A47L 11/4072* (2013.01); *A47L 11/4083* (2013.01); *A47L 2201/04* (2013.01); *G06T 7/70* (2017.01); *G06T 2207/30241* (2013.01)

(58) Field of Classification Search
CPC ....... A47L 2201/00; G06T 2207/30241; G06T 7/70
See application file for complete search history.

(56) References Cited

U.S. PATENT DOCUMENTS

| | | | |
|---|---|---|---|
| 8,898,844 | B1 | 12/2014 | Dooley et al. |
| 2004/0143927 | A1* | 7/2004 | Haegermarck ......... A47L 9/009 15/319 |
| 2004/0181896 | A1 | 9/2004 | Egawa et al. |
| 2005/0015913 | A1 | 1/2005 | Kim et al. |
| 2006/0185690 | A1 | 8/2006 | Song et al. |
| 2007/0051757 | A1 | 3/2007 | Lim et al. |
| 2007/0061040 | A1 | 3/2007 | Augenbraun et al. |
| 2008/0276407 | A1 | 11/2008 | Schnittman et al. |
| 2011/0202175 | A1 | 8/2011 | Romanov et al. |
| 2012/0168971 | A1 | 7/2012 | Hansen et al. |
| 2012/0169497 | A1 | 7/2012 | Schnittman et al. |
| 2012/0222706 | A1 | 9/2012 | Pears et al. |
| 2014/0196247 | A1 | 7/2014 | Kasper |
| 2014/0259478 | A1 | 9/2014 | Conrad |
| 2015/0182090 | A1 | 7/2015 | Park et al. |
| 2015/0223653 | A1 | 8/2015 | Kim et al. |
| 2016/0214260 | A1 | 7/2016 | Lee et al. |
| 2016/0353960 | A1 | 12/2016 | Dooley et al. |
| 2017/0147000 | A1 | 5/2017 | Hoennige et al. |
| 2017/0181591 | A1 | 6/2017 | Tanaka et al. |
| 2017/0296021 | A1 | 10/2017 | Li et al. |
| 2018/0242810 | A1 | 8/2018 | Jang et al. |
| 2019/0290089 | A1 | 9/2019 | Johnson et al. |

FOREIGN PATENT DOCUMENTS

| | | |
|---|---|---|
| JP | H10-211132 | 8/1998 |
| JP | 2014-014455 | 1/2014 |
| JP | 2014-137694 | 7/2014 |
| JP | 2015-163153 | 9/2015 |
| KR | 20-1988-0011603 | 8/1988 |
| KR | 10-0241620 | 4/2000 |
| KR | 10-2005-0012047 | 1/2005 |
| KR | 20-0395016 | 9/2005 |
| KR | 10-0661339 | 12/2006 |
| KR | 20-0437646 | 12/2007 |
| KR | 10-0814507 | 3/2008 |
| KR | 10-2008-0040761 | 5/2008 |
| KR | 10-0835968 | 6/2008 |
| KR | 10-2008-0081626 | 9/2008 |
| KR | 10-0871114 | 11/2008 |
| KR | 10-2010-0076134 | 7/2010 |
| KR | 10-1026003 | 3/2011 |
| KR | 20-0458863 | 3/2012 |
| KR | 10-2012-0069845 | 6/2012 |
| KR | 10-1152720 | 6/2012 |
| KR | 10-1164291 | 7/2012 |
| KR | 10-2012-0129185 | 11/2012 |
| KR | 10-1323597 | 11/2013 |
| KR | 10-1338143 | 12/2013 |
| KR | 10-2014-0011216 | 1/2014 |
| KR | 10-1369220 | 3/2014 |
| KR | 10-2014-0060450 | 5/2014 |
| KR | 10-1487778 | 1/2015 |
| KR | 10-2015-0014351 | 2/2015 |
| KR | 10-1495866 | 2/2015 |
| KR | 10-2015-0057959 | 5/2015 |
| KR | 10-1519685 | 5/2015 |
| KR | 10-2015-0073726 | 7/2015 |
| KR | 10-2015-0078094 | 7/2015 |
| KR | 10-2015-0095469 | 8/2015 |
| KR | 10-1543490 | 8/2015 |
| KR | 10-1544667 | 8/2015 |
| KR | 10-2015-0139111 | 12/2015 |
| KR | 10-1578879 | 12/2015 |
| KR | 10-1602790 | 3/2016 |
| KR | 10-1622740 | 5/2016 |
| KR | 10-2016-0090567 | 8/2016 |
| KR | 10-2016-0090571 | 8/2016 |
| KR | 10-1654014 | 9/2016 |
| KR | 10-1678443 | 12/2016 |
| KR | 10-2017-0049532 | 5/2017 |
| KR | 10-2017-0124216 | 11/2017 |
| KR | 10-2018-0008250 | 1/2018 |

OTHER PUBLICATIONS

International Search Report dated Dec. 7, 2018 issued in PCT/KR2018/008922.
International Search Report dated Dec. 10, 2018 issued in PCT/KR2018/008954 (English translation).
European Search Report dated Nov. 14, 2018 issued in EP Application No. 18187619.4.
European Search Report dated Nov. 14, 2018 issued in EP Application No. 18187630.1.
European Search Report dated Nov. 16, 2018 issued in EP Application No. 18187634.3.
International Search Report dated May 22, 2019 issued in PCT/KR2019/001021.
U.S. Appl. No. 16/057,448, filed Aug. 7, 2018.
U.S. Appl. No. 16/057,492, filed Aug. 7, 2018.
U.S. Appl. No. 16/256,435, filed Jan. 24, 2019.
U.S. Appl. No. 16/057,516, filed Aug. 7, 2018.
U.S. Appl. No. 16/057,076, filed Aug. 7, 2018.
U.S. Appl. No. 16/056,971, filed Aug. 7, 2018.
U.S. Appl. No. 16/057,550, filed Aug. 7, 2018.
United States Notice of Allowance dated May 11, 2020 issued in U.S. Appl. No. 16/057,572.
Korean Office Action dated Apr. 22, 2020 issued in KR Application No. 10-2019-0124685.
United States Office Action dated Jun. 17, 2020 issued in co-pending related U.S. Appl. No. 16/057,550.
U.S. Appl. No. 16/057,394, filed Aug. 7, 2018.
U.S. Appl. No. 16/057,572, filed Aug. 7, 2018.
United States Office Action dated Oct. 21, 2020 issued in U.S. Appl. No. 16/057,076.
United States Office Action dated Apr. 24, 2020 issued in U.S. Appl. No. 16/057,492.
United States Office Action dated Nov. 19, 2020 issued in U.S. Appl. No. 16/057,448.
United States Office Action dated Feb. 9, 2021 issued in U.S. Appl. No. 16/057,516.

* cited by examiner

// CLEANER

CROSS-REFERENCE TO RELATED APPLICATION(S)

This application claims the priority benefit of Korean Patent Application No. 10-2017-0099757, filed on Aug. 7, 2017 in the Korean Intellectual Property Office, the disclosure of which is incorporated herein by reference.

BACKGROUND

1. Field

The present disclosure relates to a cleaner that performs a wiping operation on a cleaning surface

2. Background

Cleaners are devices used for removing foreign substances, such as dust and the like, from the floor. A vacuum cleaner may suction foreign substances from the floor. Another type of cleaner may perform a wiping operation to remove foreign substances from the floor or other cleaning surface. A robot cleaner (also referred to as an autonomous cleaner) is a device that may perform cleaning while autonomously travelling.

Korean Patent No. 10-1654014 (registered on Aug. 30, 2016) describes a robot cleaner capable of travelling and cleaning using rag surfaces of spinning rotation members. The robot cleaner in this reference has a first rotation member and a second rotation member, to which a pair of rag surfaces are fixed. The rag surfaces are tilted downward and outward with respect to a vertical axis. The robot cleaner in this reference travels by rotation of the first rotation member and the second rotation member, while only a portion of the rag surfaces, which are fixed to the first rotation member and the second rotation member, contacts the floor due to the tilt.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
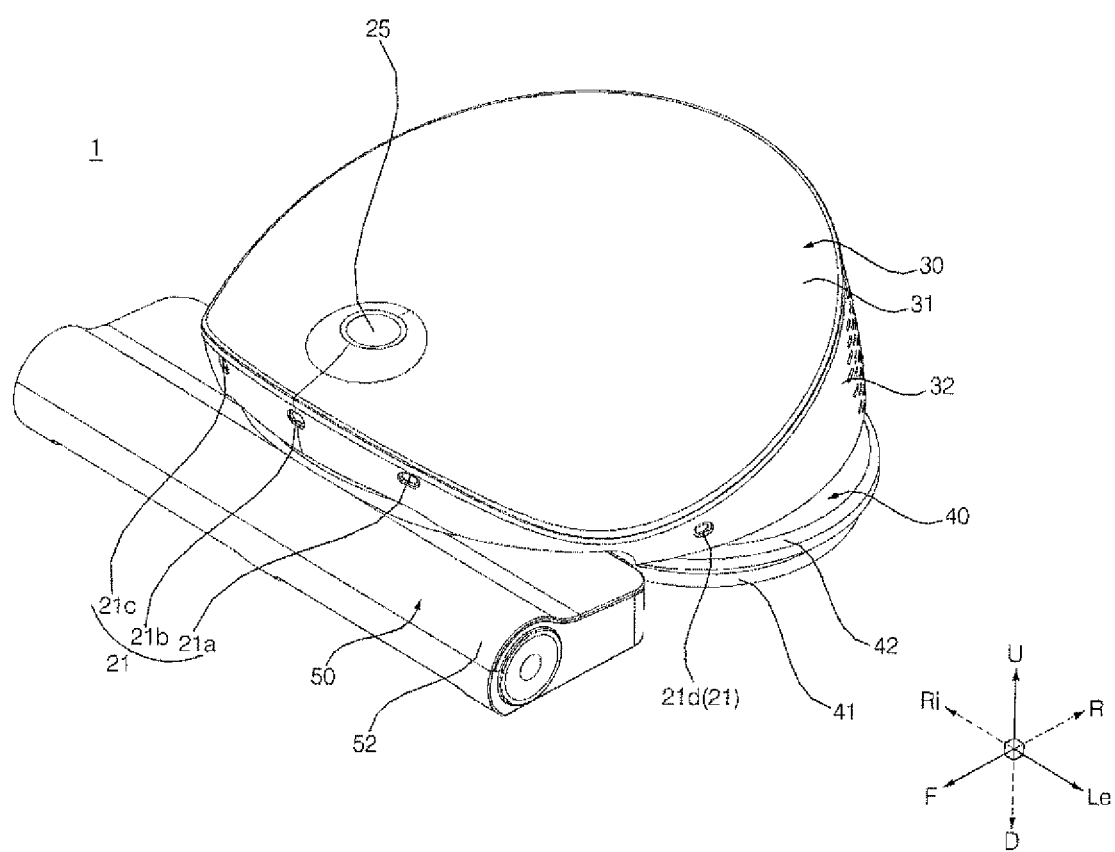
FIG. 1 is a perspective view of a cleaner according to an embodiment of the present disclosure.
Figure 2:
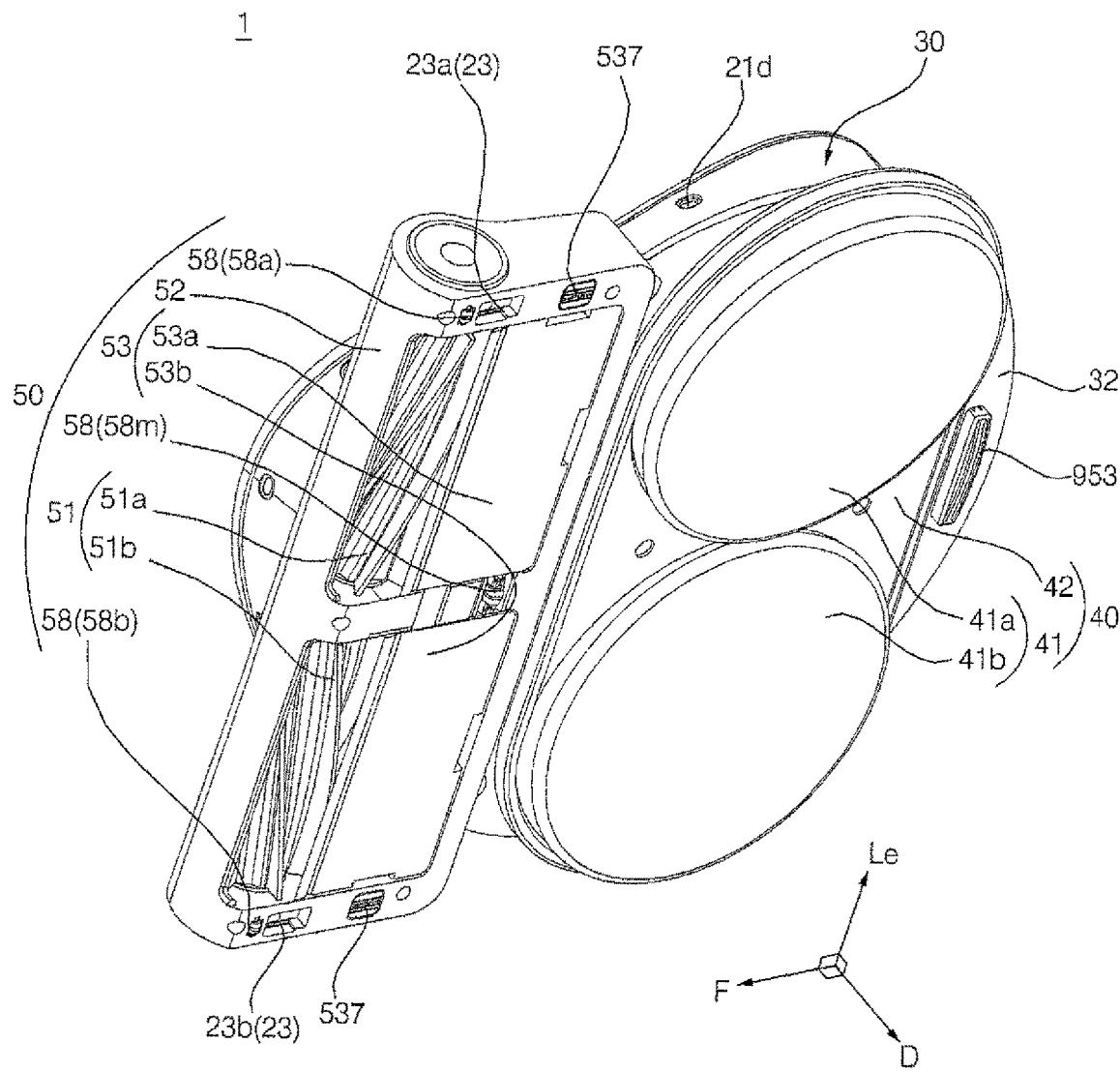
FIG. 2 is a perspective view of the cleaner illustrated in FIG. 1, as seen from a different angle.

Throughout the descriptions set forth herein, expressions indicating directions, such as front (F) and rear (R), left (Le) and right (Ri), and up (U) and down (D), are defined as indicated in the drawings, and are used only to clearly explain the application to help better understand the application. Each direction may be defined differently according to a reference point.

Terms such as "first," "second," and "third" used herein to describe various elements, are used only to distinguish one element from the other to avoid confusion, and do not imply a sequence, importance or a master-slave relationship between these elements. For example, an embodiment may be implemented in which only the second element is included without the first element. A "rag" as used herein may refer to a mop pad or other component that is moved to wipe a cleaning surface and may be made of various materials, such as fabric, paper, and the like. The rag materials may be washable when dirty for reuse or may be disposable after use to be replaced by another rag or other cleaning material.

The principles described in present disclosure may be applied to a manual cleaner which travels by a user's manual control or to a robot cleaner which travels autonomously. Hereinafter, these principles will be described with respect to a robot cleaner. However, it should be appreciated that principles described in present disclosure may also be applied to a manually controlled cleaner.

As illustrated in FIGS. 1 to 17, a cleaner (also referred to as a robot cleaner or an autonomous cleaner) 1 according to an embodiment of the present disclosure may include a body 30 having a controller (Co). The cleaner 1 may include a mop module (or mop head) 40 which contacts a floor (surface to be cleaned) to wipe or otherwise clean the floor.

The cleaner 1 may include a collection module (or cleaning head) 50 which removes and collects foreign substances from the floor.

The mop module 40 may support a portion (e.g., a rear portion) of the body 30. The collection module 50 may support another portion (e.g., a front portion) of the body 30. Thus, the body 30 may be supported on a floor or other cleaning surface by the mop module 40 and the collection module 50. The body 30 forms an outer appearance of the cleaner 1. The body 30 may connect the mop module 40 and the collection module 50.

The mop module 40 may be coupled to a lower surface of the body 30. The mop module 40 may include at least one rag part (or rag surface) 411 which wipes the floor while rotating. The mop module 40 may include at least one spin mop 41 which contacts the floor while rotating clockwise or counterclockwise when viewed from the top. The mop module 40 may include a pair of spin mops 41a and 41b. The pair of spin mops 41a and 41b wipes the floor while rotating clockwise or counterclockwise. The pair of spin mops 41a and 41b may include a left spin mop 41a and a right spin mop 41b. In one embodiment, the spin mops 41 may be configured to rotate about rotation axes Osa and Osb which extend substantially vertically (e.g., Substantially in an up-and-down direction).

The mop module 40 may be positioned below the body 30 and rearward of the collection module 50 (e.g., such that the mop module 40 wipes a region of a floor surface after the collection module 50 removes foreign substances from that region of the floor surface).

Each of the left spin mop 41a and the right spin mop 41b may include a rag part 411, a rotary plate 412, and a spin shaft 414. Each of the left spin mop 41a and the right spin mop 41b may include a water accommodation portion (or water accommodation cavity) 413. Each of the left spin mop 41a and the right spin mop 41b may include a slave joint 415. Descriptions of the rag part 411, the rotary plate 412, the spin shaft 414, the water accommodation portion 413, and the slave joint 415, which will be described later, may be understood as descriptions of elements included in each of the left spin mop 41a and the right spin mop 41b.

The collection module 50 may be is positioned at a position forward and spaced apart from the mop module 40. The collection module 50 contacts the floor at a position spaced apart from and forward of the mop module 40. The collection module 50 collects foreign substances from the floor. The collection module 50 is positioned in front of the mop module 40. The collection module 50 collects foreign substances from the floor at a position forward of the mop module 40.

The collection module 50 may contact the floor. The collection module 50 is positioned below the body 30. The collection module 50 contacts the floor at a position forward of the mop module 40. In the embodiment, the collection module 50 may include an auxiliary wheel 58 which contacts the floor.

The collection module 50 may include at least one collection unit (or collection bin) 53 which forms a collection space 53s to store the collected foreign substances. The collection unit 53 may include a pair of collection units 53a and 53b that are left-right symmetric with respect to a central vertical plane Po. Further, the collection module 50 may include at least one sweeping unit (or roller) 51 which contacts the floor while rotating to suction or otherwise collect the foreign substances from the floor into the collection space 53s.

In the embodiment, the collection module 50 may include the collection unit 53 and the sweeping unit 51. The sweeping unit 51 rotates about a rotation axis Of which extends in a horizontal direction (e.g., parallel to a floor surface being cleaned). The rotation axis Of of the sweeping unit 51 may be an axis that extends in a left-and-right direction relative to the cleaner 1. The sweeping unit 51 is positioned forward of the collection unit 53. The pair of sweeping units 51 may be positioned forward of the pair of collection units 53. A blade 511 of the sweeping unit 51 sweeps the floor to collect relatively large foreign substances into the collection unit 53 when the sweeping unit 51 rotates.

In another example, the collection module 50 may wipe the floor while sliding on the floor as the body 30 travels. In yet another example, the collection module 50 may wipe the floor while rotating. In still another example, the collection module 50 may be capable of vacuum cleaning that suctions contaminants. Hereinafter, descriptions will be made based on the embodiments, but a specific embodiment of cleaning of the collection module 50 may be modified.

The cleaner 1 may include the body 30 which is movable by at least one rotation action of the mop module 40 and the collection module 50 without a separate driving wheel. The body 30 may travel solely due to the rotation of the mop module 40. In the cleaner 1, the body 30 may be movable by the rotation of the pair of spin mops 41a and 41b without a separate driving wheel.

The cleaner 1 may include a mop driving unit (or mop driving motor) 60 which provides a driving force to the mop module 40. Torque provided by the mop driving unit 60 is transmitted to the spin mop 41.

The cleaner 1 may include a collection driving unit (or collection driving motor) 70 which provides a driving force to the collection module 50 to rotate the sweeping unit 51. Torque provided by the collection driving unit 70 is transmitted to the sweeping unit 51.

The cleaner 1 may include a water supply module (or water supply) 80 which supplies water for wiping. The water supply module 80 may supply water necessary for the mop module 40 or the collection module 50. In the embodiment, the water supply module 80 supplies water to the mop module 40. The water supply module 80 supplies water to the pair of spin mops 41a and 41b.

The water supply module 80 may include a water tank 81 which stores water to be supplied to the mop module 40 or the collection module 50. In one embodiment, the water tank 81 stores water to be supplied to the mop module 40. The mop module 40 may perform wet-type wiping by wetting the rag surface 411 with water from the water supply module 80 to clean the floor surface and the move the cleaner 1.

The cleaner 1 may include a battery Bt to provide power. The battery Bt may provide power for rotation of the mop module 40. For example, the battery Bt may drive the mop driving unit 60. Additionally or alternatively, the battery Bt may provide power for rotation of the collection module 50. For example, the battery Bt may drive the collection driving unit 70.

The body 30 and the mop module 40 may be detachably connected with each other. A state where the body 30 and the mop module 40 are connected may be referred to as a "connected state," and a state where the body 30 and the mop module 40 are separated from each other may be referred to as a "separated state". The cleaner 1 may include a detaching module (or mop release mechanism) 90 (see FIG. 16) which detachably engages the mop module 40 to the body 30. In the separated state, the detaching module 90 may release the mop module 40 from the body 30. The detaching module 90 enables the mop module 40 and the body 30 to be detachably connected with each other. In the connected state, the detaching module 90 may enable the mop module 40 to be engaged with the body 30. In one example, the detaching module 90 may be positioned across the gap between the water tank 81 and the battery Bt.

Referring to FIGS. 1 to 9, the cleaner 1 may include a case 31 which forms an outer appearance of the body 30. In one example, the case 31 forms a three-dimensional curved surface which is upwardly convex. The cleaner 1 may include a base 32 which forms a bottom surface of the body 30. The base 32 may form a bottom surface, a front surface, a rear surface, a left surface, and a right surface, of the body 30. The mop module 40 may be connected to the base 32. The collection module 50 may also be connected to the base 32. The controller Co and the battery Bt are positioned in an inner space formed by the case 31 and the base 32. Further, the mop driving unit 60 may be positioned in the body 30. The water supply module 80 may also be positioned in the body 30. The detaching module 90 is also positioned in the body 30.

The cleaner 1 may include a module housing (or mop module hosing) 42 which forms an outer appearance of the mop module 40. The module housing 42 is positioned below the body 30. The cleaner 1 may include a module cabinet (or collection module housing) 52 which forms an outer appearance of the collection module 50. The module cabinet 52 is positioned below the body 30. The module housing 42 and the module cabinet 52 are positioned spaced apart from each other in a forward and backward direction.

The cleaner 1 may include the auxiliary wheel 58 which is positioned at a position spaced apart from the mop module 40 in a forward and backward direction. The auxiliary wheel 58 may prevent the cleaner 1 from overturning forward and rearward. The auxiliary wheel 58 may position the sweeping unit 51 a given distance from, thereby positioned the sweeping unit 51 to perform sweeping efficiently.

The cleaner 1 may include a battery insertion unit (or battery insertion cover) 39 that is used by a user to replace the battery Bt. The battery insertion unit 39 may be positioned on the bottom surface of the body 30.

A cleaner 1 may include a sensing module (or sensors) which detect external conditions. The sensing module may include at least one of the following: a bumper (not shown) which senses contact with an external obstacle; an obstacle sensor 21 which senses an external obstacle spaced apart from the cleaner; and a cliff sensor 23 which senses the presence of a cliff on a traveling surface (floor). The sensing module may include an image sensor 25 which captures or otherwise senses external images. The sensing module may include a gyroscopic (gyro) sensor which senses an actual rotation angle of the cleaner 1. The sensing module may include an encoder (not shown) which recognizes an actual traveling path of a robot cleaner 1. The auxiliary wheel 58 may be coupled to the encoder. For example, the encoder may detect the actual traveling path of the robot cleaner 1 based on a quantity of rotations of the auxiliary wheel 58.

The cleaner 1 may travel autonomously. The robot cleaner 1 may travel autonomously based on sensor data collected by the sensing module. For example, the cleaner 1 may autonomously learn a traveling area. The cleaner 1 may recognize a current position in the traveling area. By using the sensing information of the sensing module, the robot cleaner 1 may learn the traveling area and recognize the current position.

The cleaner 1 may include a bumper (not shown) which senses when the collection module 50 contacts an external object. The bumper may include a surface which is exposed to the outside of the cleaner 1. When the external object comes into contact with the bumper, the bumper may be pressed such that a bumper switch (not shown) positioned inside the cleaner 1 is pressed. The bumper switch is pressed when the collection module 50 is pressed rearward based on contacting the obstacle.

The cleaner 1 may include the obstacle sensor 21 which senses a forward obstacle. A plurality of obstacle sensors 21a, 21b, 21c, 21d, and 21e may be provided. The obstacle sensor 21 may include the obstacle sensors 21a, 21b, and 21c which sense an obstacle forward of the cleaner 1. The obstacle sensor 21 may include the obstacle sensors 21d and 21e which senses an obstacle on the left side and the right side of the cleaner 1. The obstacle sensor 21 may be positioned in the body 30. The obstacle sensor 21 may emit ultrasonic waves and detect reflections of these ultrasonic waves from an obstacle. For example, when the robot cleaner 1 performs cleaning while traveling straight near a left (right) wall, and senses a forward obstacle, the robot cleaner 1 makes a curved movement to rotate 180 degrees, and travels straight while cleaning to avoid the wall and obstacle. In this case, the robot cleaner 1 may perform cleaning while travelling in zigzags with a cleaning trajectory partially overlapping.

The cleaner 1 may include a cliff sensor 23 which senses the presence of a cliff on the floor. A plurality of cliff sensors 23a and 23b may be provided. The cliff sensors 23a and 23b may be provided below the collection module 50 to sense the presence of a cliff. A cliff sensor (not shown) may also be provided rearward of the mop module 50 to sense the presence of a cliff. The cliff sensors 23a and 23b may sense the presence of a cliff forward of the mop module 40.

The cleaner 1 may include the image sensor 25 which captures external images of a region around the cleaner 1. The image sensor 25 may be positioned in the body 30. The image sensor 25 may capture an image upward from the body 30.

The cleaner 1 may include a power switch 29 to switch on and off power supply. The cleaner 1 may include an input unit (or user interface) (not shown) to receive input related to various instructions from a user. The cleaner 1 may include a communication module or antenna (not shown) to communicate with an external device.

The cleaner 1 may include a communication module (or communication interface) (not shown) to connect to a network. According to a communication protocol, the communication module may be implemented by using wireless communication techniques such as IEEE 802.11 WLAN, IEEE 802.5 WPAN, UWB, Wi-Fi, Zigbee, Z-wave, BlueTooth, and the like. For example, the communication module may include an Ultra-Wideband (UWB) sensor and the like to recognize the current indoor location of the cleaner 1.

The cleaner 1 may include an Inertial Measurement Unit (IMU) (not shown). Based on the information of the IMU, the cleaner 1 may stabilize a traveling motion.

The cleaner 1 may include a manipulation unit (or release button) 953 to separate the body 30 and the mop module 40. The manipulation unit 953 may be exposed to the outside of the cleaner 1. Once the manipulation unit 953 is pressed, the mop module 40 may be released from the body 30.

The cleaner 1 may include the controller Co which controls autonomous traveling. The controller Co may control traveling of the cleaner 1 by receiving input of a sensing signal of the sensing module. The controller Co may process a sensing signal of the obstacle sensor 21. The controller Co may process a sensing signal of the cliff sensor 23. The controller Co may process a sensing signal of the bumper. The controller Co may process a sensing signal of the image sensor 25. The controller Co may process a sensing signal of the UWB sensor and the IMU. The controller Co may process a signal of the input unit or a signal input through the communication module. The controller Co may include a printed circuit board (PCB) included in the body 30 (see FIGS. 14 to 17).

The controller Co may also control the water supply module 80 to selectively supply water to the mop module 40. The controller Co may control a pump 85 to adjust the amount of water to be supplied to the mop module 40. By the control of the pump 85, the amount of water supplied to the mop module 40 per hour may be changed. In another example, the controller Co may control an opening and closing of a valve (not shown), which will be described later, so as to change whether water is supplied.

The controller Co may learn a traveling area by using images sensed by the image sensor 25 and may recognize a current position of the cleaner 1. The controller Co may perform mapping of the traveling area by using the images. The controller Co may recognize the current location on a map mapped by using the images. The images captured by the image sensor 25 may be used to generate a map of the traveling area and to sense the current location in the traveling area. For example, the controller Co may generate a map of the traveling area by using a boundary between the ceiling and a side surface in the upper side images captured by the image sensor 25. Further, the controller Co may sense the current location in the traveling area based on feature points of the images.

The controller Co may control the robot cleaner 1 to return to a charging stand after traveling. For example, the robot cleaner 1 may return to the charging stand by sensing an infrared (IR) signal transmitted from the charging stand. The controller Co may control the robot cleaner 1 to return to the charging stand based on the signal transmitted from the charging stand and sensed. The charging stand may include a signal transmitter (not shown) which transmits a return signal. The return signal may be an ultrasonic signal, an infrared signal, or UWB signal, but is not limited thereto.

In another example, the controller Co may recognize the current location of the robot cleaner 1 on the map and may control the robot cleaner 1 to return to the charging stand. The controller Co may recognize a location corresponding to the charging stand and the current location, and based on the recognized locations, the robot cleaner 1 may return to the charging stand.

The controller Co may control the cleaner 1 based on information input from a user terminal (e.g., smartphone, computer, etc.) that is separate from the cleaner 1. The cleaner 1 may receive the input information through the communication module. The controller Co may control a traveling pattern (e.g., traveling in zigzags or traveling to clean a certain area intensively) of the cleaner 1. Based on the input information, the controller Co may control activation of specific functions (e.g., finding a lost article, repelling insects, etc.). Based on the input information, the controller Co may set a cleaning start point of the cleaner 1 to be a specific point (cleaning reservation function).

Figure 7:
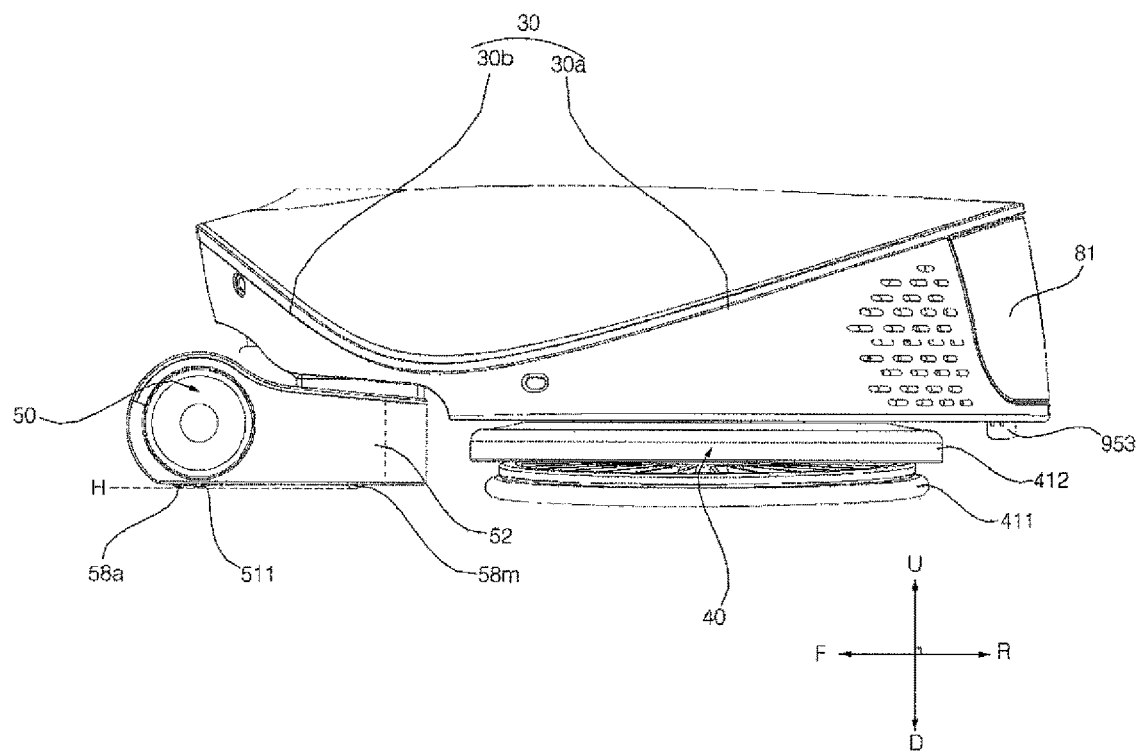
FIG. 7 is an elevation view of the cleaner illustrated in FIG. 1, as seen from the lateral side (left side)

The body 30 may include a first portion (or front section) 30a positioned above the mop module 40, and a second portion (or rear section) 30b positioned above the collection module 50 (see FIG. 7). The first portion 30a and the second portion 30b may be integrally formed. The body 30 may include the case 31, which forms an outer appearance, and the base 32.

Referring to FIGS. 1 to 12, the collection module 50 contacts the floor forward of the mop module 40. The collection module 50 moves according to movement of the body 30. The collection module 50 sweeps up or otherwise collect foreign substances from the floor. The collection module 50 may move forward to collect foreign substances from the floor into the collection space 53s. The collection module 50 may be left-right symmetric.

The collection module 50 may include at least one sweeping unit 51 which sweeps the floor. In one example, the collection module 50 may include a pair of sweeping units 51a and 51b. The collection module 50 may include at least one collection unit 53 which stores foreign substances collected from the floor. In one example, the collection module 50 may include a pair of collection units 53a and 53b. The collection module 50 may include a module cabinet (or collection module housing) 52 in which the sweeping unit 51 and the collection unit 53 are positioned. The module cabinet 52 may be connected to the body 30. A lower surface of the collection module 50 may include the auxiliary wheel 58 which rolls while contacting the floor to reduce friction and to space the collection module 50 from the floor. The auxiliary wheel 58 may be positioned below the module cabinet 52.

Figure 12:
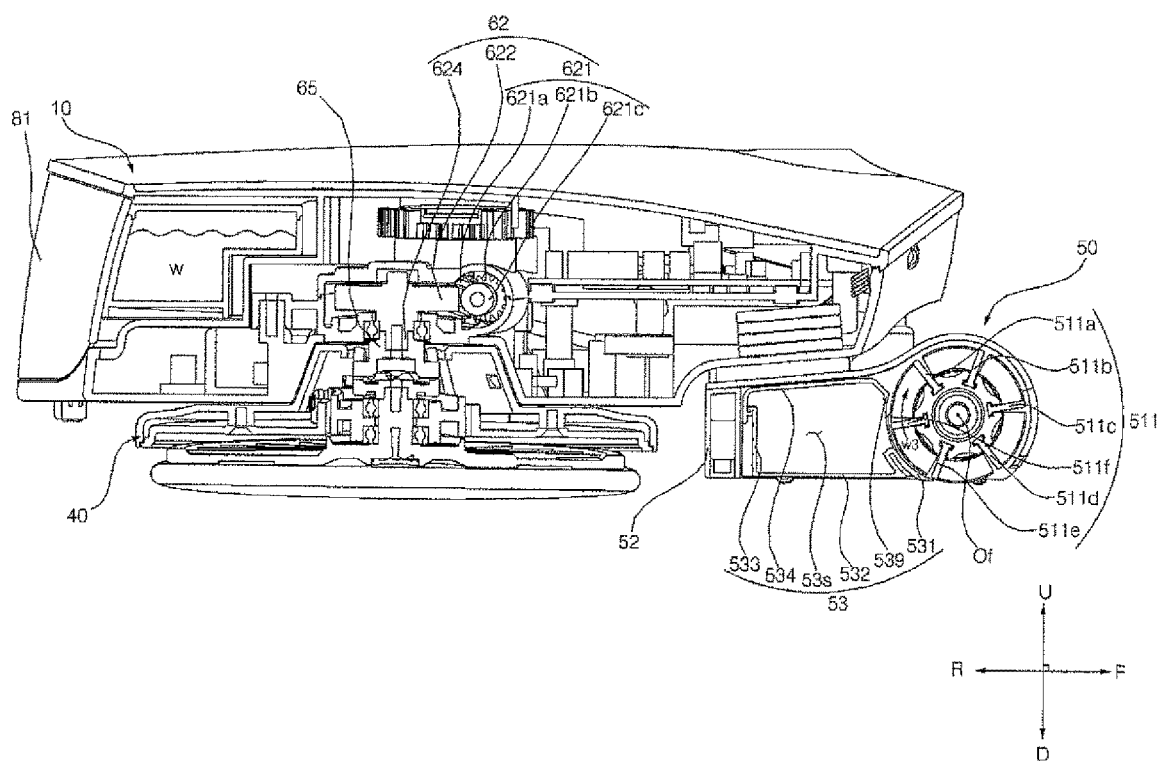
FIG. 12 is a cross-sectional view of the cleaner of FIG. 8, vertically taken along line S3-S3' of FIG. 8.

As illustrated in FIG. 12, the sweeping unit 51 rotates about the rotation axis Of that extends horizontally. The rotation axis Of may be extended in a direction parallel to an arrangement direction of the left spin mop 41a and the right spin mop 41b. The rotation axis Of may extend horizontally. The rotation axis Of of the left sweeping unit 51a and the rotation axis Of of the right sweeping unit 51b may be substantially identical to each other. As illustrated in FIG. 12, when viewed from the right side, a clockwise rotation direction of the sweeping unit 51 may be defined as a third forward (or circumferential) direction w3. The sweeping unit 51 may sweep up the foreign substances from the floor into the collection space 53s while rotating in the third forward direction w3.

The pair of sweeping units 51a and 51b may be left-right symmetric. The pair of sweeping units 51a and 51b may be left-right symmetric with respect to the central vertical plane Po. The central vertical plane Po is defined as a virtual plane which passes through the center of the pair of the spin mops 41a and 41b which are left-right symmetric, and which is perpendicular to a left-and-right direction (see FIGS. 15 and 17). The left sweeping unit 51a and the right sweeping unit 51b are left-right symmetric. Hereinafter, descriptions of each element of the sweeping unit 51 may be understood as description of each of the pair of sweeping units 51a and 51b.

The sweeping unit 51 may include a blade 511 which directly contacts the floor. The blade 511 is fixed to an outer circumference surface of the rotation member 512. The blade 511 may protrude from the circumference surface of the rotation member 512 in a direction further away from the rotation axis Of.

In one embodiment, the blade 511 is of a plate or wiper type, but the blade 511 may be formed to have a plurality of brushes which are densely positioned. The blade 511 is may extend substantially in a left-and-right direction, and may extend in a spiral shape along the circumference of the rotation axis Of. The spiral extending direction of the blade 511 of the left sweeping unit 51 and the spiral extending direction of the blade 511 of the right sweeping unit 1 may be opposite to each other. A plurality of blades 511 may be provided. In one embodiment, six blades 511a, 511b, 511c, 511d, 511e, and 511f are spaced from each other at predetermined intervals along the circumference of the rotation member 512.

The collection module 50 may include a rotation member 512 which is rotatable. The rotation member 512 supports the blade 511. The blade 511 is fixed to an outer circumferential surface of the rotation member 512. The rotation member 512 is formed longitudinally in an extending direction of the rotation axis Of. The rotation member 512 has a cavity 512s formed at the inner side thereof. The rotation member 512 receives a driving force of the collection driving unit 70, and rotates along with the blade 511. The rotation member 512 rotates about the rotation axis Of.

The collection module 50 may include a first axis portion (or first axial end) 514 positioned at one end of the rotation member 512. The collection module 50 may include a second axis portion (or second axial end) 515 positioned at the other end of the rotation member 512. The first axis portion 514 and the second axis portion 515 are positioned at both ends in the extending direction of the rotation axis Of of the collection module 50.

The first axis portion 514 and the second axis portion 515 are positioned at opposing ends of the rotation member 512. For example, the first axis portion 514 may be positioned on a right end portion of the rotation member 512 of the left sweeping unit 51, and the second axis portion 515 may be positioned on a left end portion thereof. The first axis portion 514 is positioned on the left end portion of the rotation member 512 of the left sweeping unit 51, and the second axis portion 515 is positioned on the right end portion thereof.

One end of the rotation member 512 may be recessed inward, and the first axis portion 514 may be positioned at the recessed portion on the one end of the rotation member 512. The other end of the rotation member 512 may be recessed inward, and the second axis portion 515 may be positioned at the recessed portion on the other end of the rotation member 512.

The first axis portion 514 may connect the one end of the rotation member 512 and the collection driving unit 70. The first axis portion 514 may be recessed in a direction of the rotation axis Of. An end portion of the sweeping shaft 74 may be fixed in a groove of the first axis portion 514. When the sweeping shaft 74 rotates, the first axis portion 514 rotates integrally with the sweeping shaft 74, and the sweeping unit 51 rotates.

The second axis portion 515 may connect the other end of the rotation member 512 and the module cabinet 52. The second axis portion 515 may protrude in a direction of the rotation axis Of. The protrusion of the second axis portion 515 is inserted into a groove formed on the module cabinet 52.

The module cabinet 52 forms an outer appearance of the collection module 50. The module cabinet 52 may be left-right symmetric. The module cabinet 52 forms a top surface which is connected to a portion of the body 30. The module cabinet 52 may also include a bottom surface which is formed to face the floor (surface to be cleaned) and to include an opening through which the blades 511 extend. The module cabinet 52 forms a distal end of a foremost portion of the cleaner 1. In the case where the module cabinet 52 collides with an external object, the cleaner 1 may sense the shock.

The module cabinet 52 may have a sweeping unit arrangement groove (or sweeping unit receiving groove) 52g formed by the bottom surface and is recessed upward so that the sweeping unit 51 may be positioned therein. The bottom portion of a front end of the sweeping unit arrangement groove 52g may be opened forward.

The module cabinet 52 may further have a collection unit arrangement groove (or collection unit receiving groove) 52h formed by the bottom surface and is recessed upward so that the collection unit 53 may be positioned therein. The collection unit arrangement groove 52h is positioned rearward of the sweeping unit arrangement groove 52g. The collection unit arrangement groove 52h and the sweeping unit arrangement groove 52g may be connected in a forward and backward direction.

The collection unit 53 may define a collection space 53s which receives and stores foreign substances drawn up by the blade 511. The collection space 53s is positioned rearward of the sweeping unit 51. The pair of collection units 53a and 53b may each include respective collection space 53s.

The pair of collection units 53a and 53b may be left-right symmetric. The pair of collection units 53a and 53b are left-right symmetric with respect to the central vertical plane Po. The left collection unit 53a and the right collection unit 53b may be left-right symmetric. Hereinafter, descriptions of each element of the collection unit 53 may be understood as descriptions of each of the pair of collection units 53a and 53b.

Figure 8:
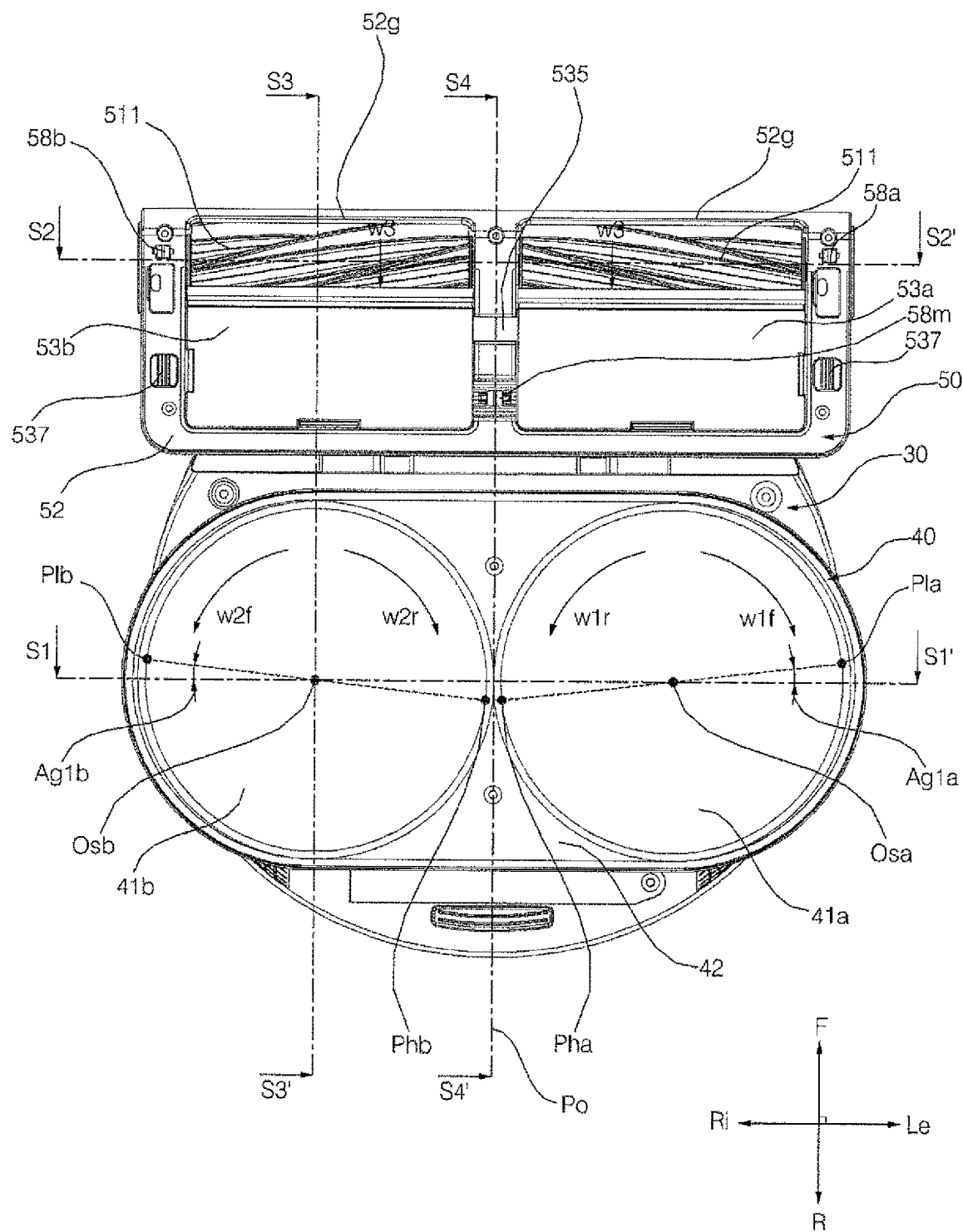
FIG. 8 is an elevation view of the cleaner illustrated in FIG. 1, as seen from the bottom side.
Figure 9:
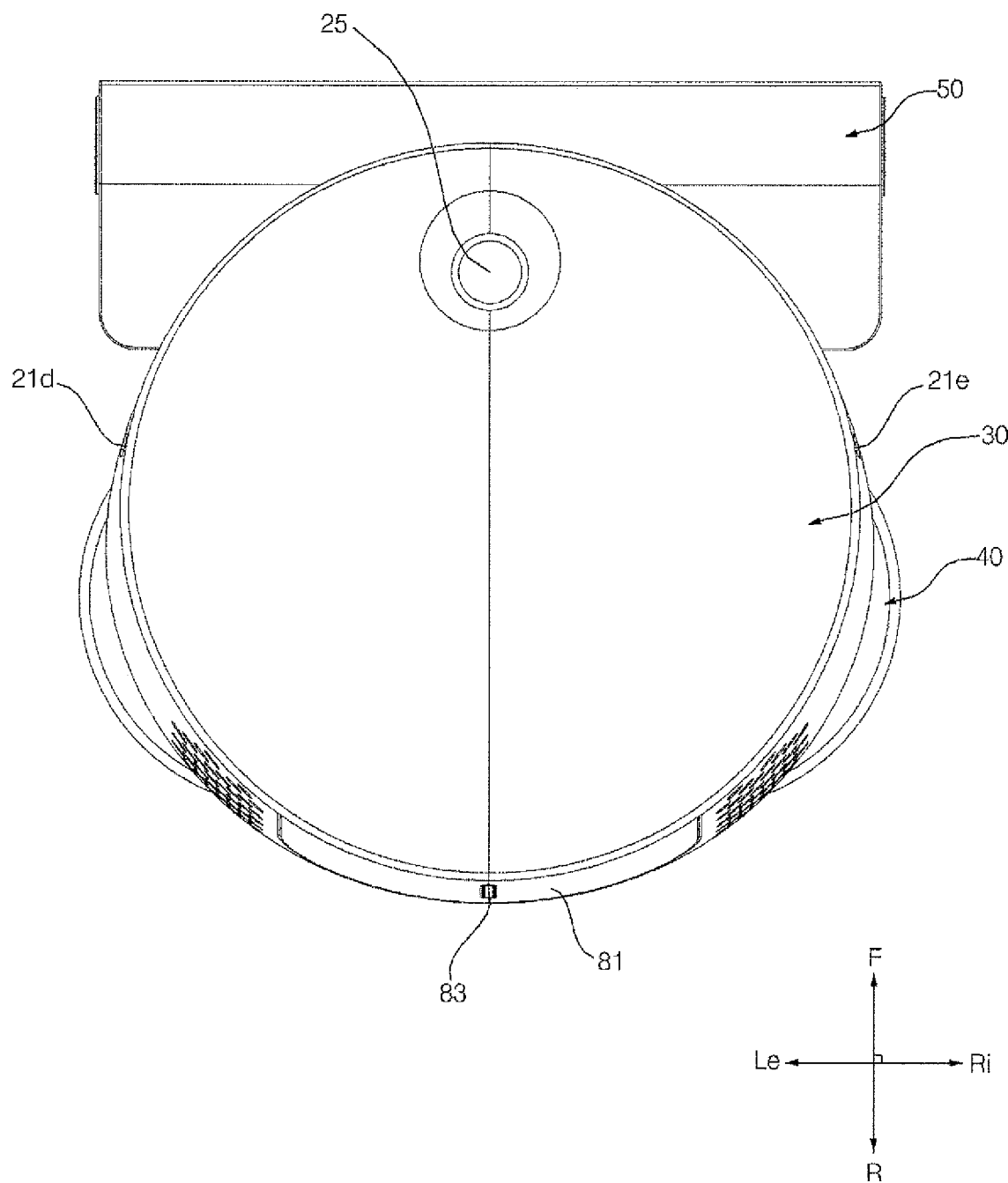
FIG. 9 is an elevation view of the cleaner of FIG. 1, as seen from the top side.
Figure 10:
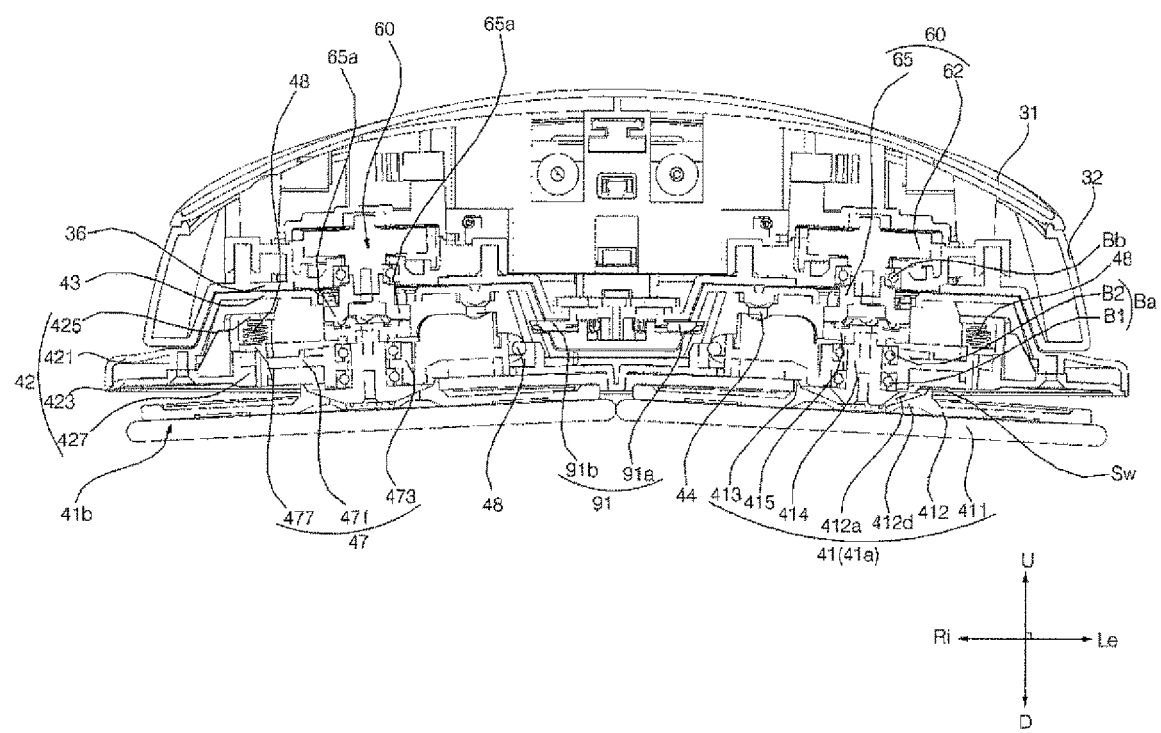
FIG. 10 is a cross-sectional view of the cleaner of FIG. 8, vertically taken along line S1-S1' of FIG. 8.
Figure 11:
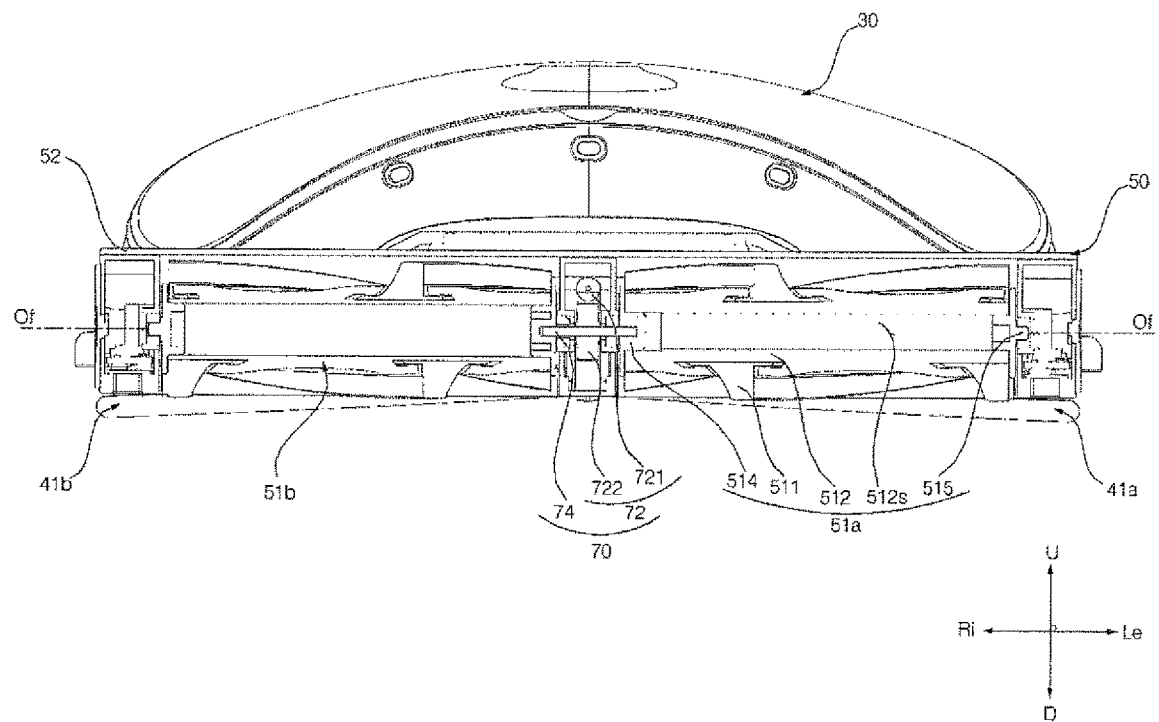
FIG. 11 is a cross-sectional view of the cleaner of FIG. 8, vertically taken along line S2-S2' of FIG. 8.
Figure 13:
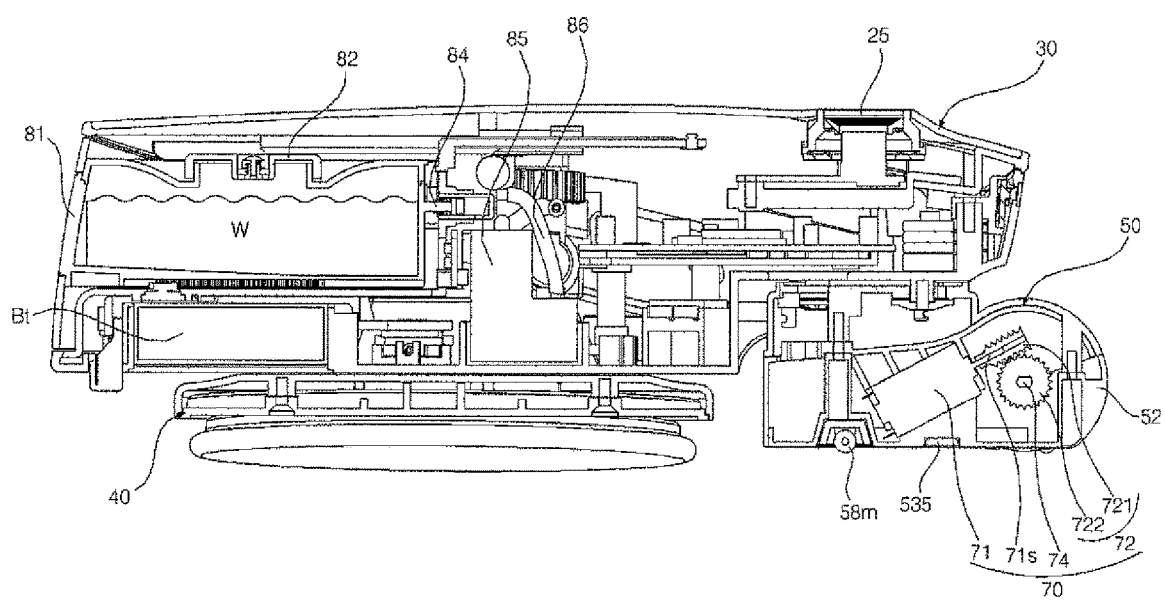
FIG. 13 is a cross-sectional view of the cleaner of FIG. 8, vertically taken along line S4-S4' of FIG. 8.
Figure 14:
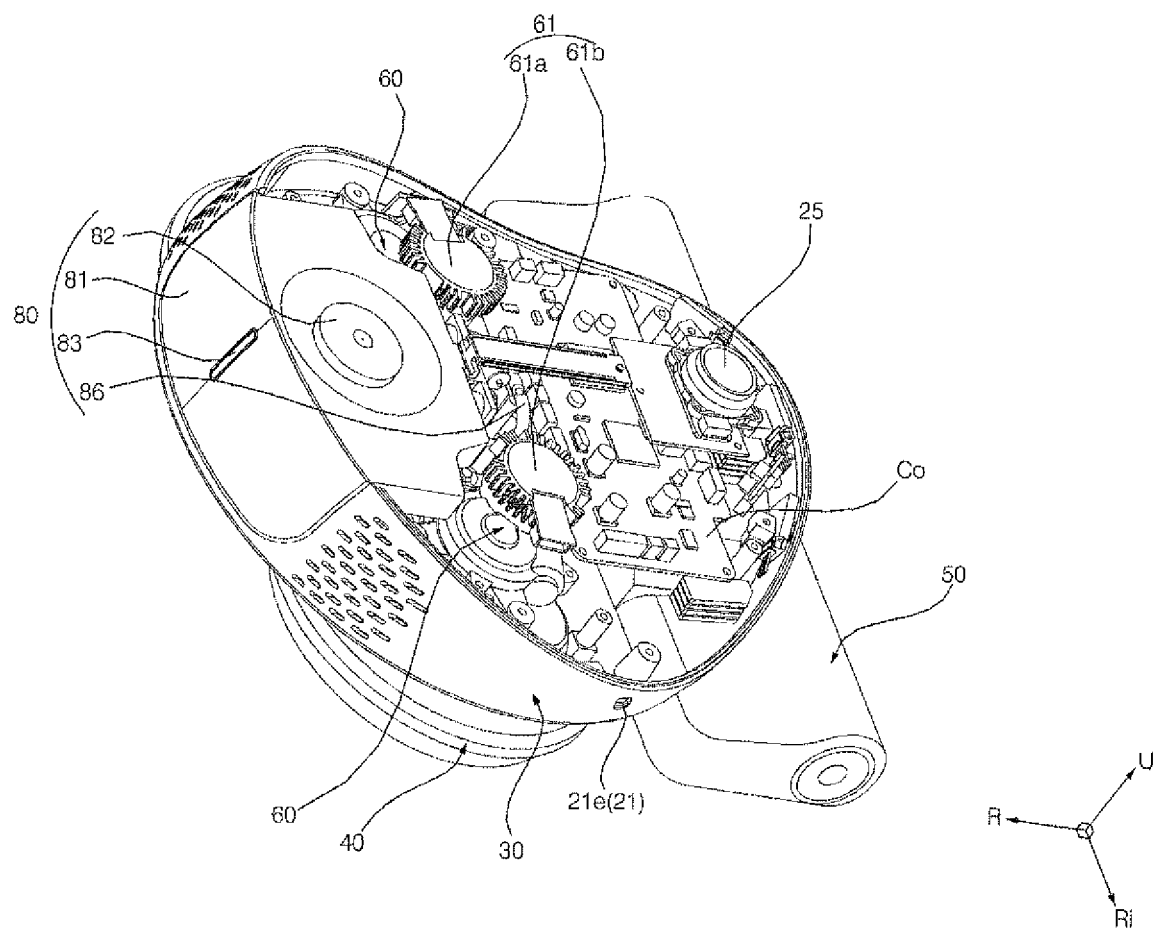
FIG. 14 is a perspective view of the cleaner of FIG. 1 from which a case 31 is removed.

As illustrated in FIGS. 8, 12, and 13, the left side and the right side of the collection space 53s may be blocked by a wall of the module cabinet 52. The rear side, the top side, and the bottom side of the collection space 53s may be blocked by walls of the module cabinet 52. The collection unit 53 may include a bottom surface 532 which forms the bottom side of the collection space 53s. The collection unit 53 may include a top surface 534 which forms the top side of the collection space 53s.

The collection space 53s is opened forward (e.g., on a front surface facing the sweeping unit 51. The collection unit 53 has an open portion which is formed at the front, and communicates with the collection space 53s. Foreign substances pushed by the sweeping unit 51 from the front side to the rear side are introduced into the collection space 53s through the open portion of the collection unit 53.

The collection unit 53 may include an edge portion (or edge wall) 531 which forms edges extended in a left-and-right direction at the lower front end of the collection unit 53. The edge portion 531 is positioned at the lower front end of the collection space 53s. The edge portion 531 is fixed to a front end of the bottom surface 532. The top surface of the edge portion 531 has an inclined portion, which is inclined rearward such that the height becomes higher toward the rear side thereof. The front end of the edge portion 531 is positioned adjacent to a rotation trajectory of the blade 511, such that the edge portion 531 guides the foreign substances smoothly into the collection space 53s.

The collection unit 53 may include a top edge portion (or top edge surface) 539 which forms edges extended in a left-and-right direction at the upper front end of the collection unit 53. The top edge portion 539 is positioned at the upper front end of the collection space 53s. The top edge portion 539 is fixed to a front end of the top surface 534. The bottom surface of the top edge portion 539 has an inclined portion, of which height becomes higher toward the rear side thereof. The front end of the top edge portion 539 is positioned adjacent to a rotation trajectory of the blade 511, thereby helping foreign substances, which are scattered rearward and upward of the blade, to be introduced into the collection space 53s.

The collection unit 53 may include a set connection unit (or collection unit connection wall) 535 which couples a pair of collection units 53. A portion of the set connection unit 535 may be positioned between the pair of collection units 53. The set connection unit 535 is positioned below the collection unit 53. The set connection unit 535 is exposed downward of the module cabinet 52.

The collection unit 53 may be detachable from the module cabinet 52. The collection unit 53 may include a collection unit releasing button 537, so that when the collection unit releasing button 537 is pressed, the collection unit 53 is released from the module cabinet 52. A pair of collection unit releasing buttons 537 may be positioned to be left-right symmetric. The pair of collection units 53 are connected by the set connection unit 535, such that the pair of collection units 53 may be connected to or detached from the module cabinet 52 at the same time when the collection unit releasing button 537 is pressed.

The auxiliary wheel 58 may be positioned at the bottom surface of the module cabinet 52. The auxiliary wheel 58 rolls to enable the module cabinet 52 to smoothly move back and forth on the floor surface. As illustrated in FIG. 7, the auxiliary wheel 58 may be provided so that the floor H and the bottom surface of the module cabinet 52 are spaced apart from each other in a distance range in which the pair of sweeping units 51 may still extend adjacent to or contact the flat floor H.

At least one auxiliary wheel 58 is left-right symmetric with respect to the central vertical plane Po. A plurality of auxiliary wheels 58a, 58b, and 58m may be provided. The plurality of auxiliary wheels 58a, 58b, and 58m may be left-right symmetric. The pair of auxiliary wheels 58a and 58b, each of which is positioned on the left side and the right side, may be provided. The left auxiliary wheel 58a is positioned on the left side of the left sweeping unit 51a. The right auxiliary wheel 58b is positioned on the right side of the right sweeping unit 51b. The pair of auxiliary wheels 58a and 58b are left-right symmetric.

Further, a central auxiliary wheel 58m may be provided. The central auxiliary wheel 58m is positioned between the pair of collection units 53. The central auxiliary wheel 58m is spaced apart from the pair of auxiliary wheels 58a and 58b in a forward and backward direction. The central auxiliary wheel 58m may be positioned on the central vertical plane Po.

As illustrated in FIG. 13, the collection driving unit 70 may be a motor that provides a driving force to rotate the sweeping unit 51. The collection driving unit 70 may provide torque to both of the pair of sweeping units 51, or the collection driving unit 70 may provide torque to one of the sweeping units 51, and rotation of that sweeping units 51 may drive another sweeping unit 51. For example, the collection driving unit 70 may provide a driving force to rotate the rotation member 512.

The collection driving unit 70 is positioned at or within the collection module 50. The collection driving unit 70 is left-right symmetric with respect to the central vertical plane Po. For example, the collection driving unit 70 may be positioned on the central vertical plane Po.

Although not illustrated in the drawings, the collection driving unit 70 may be configured to transmit torque, obtained by a rotation of the auxiliary wheel 58 without a motor, to the sweeping unit 51 in another embodiment. For example, the collection driving unit 70 may include a gear that is rotated through the rotation of the auxiliary wheel 58 to transmit torque to the sweeping unit 51. In an embodiment illustrated in the drawings, the collection driving unit 70 may include a motor 71 to transmit torque to the sweeping unit 51, and descriptions below will be made based on this embodiment.

The collection driving unit 70 may include a sweeping motor 71 having a motor rotation axis 71s positioned on the central vertical plane Po. For example, the sweeping motor 71 may include a shaft positioned on the central vertical plane Po. The motor rotation axis 71s is extended in a direction perpendicular to a left-and-right direction. In one embodiment, the motor rotation axis 71s is extended diagonally forward and upward.

The sweeping motor 71 may be positioned at a gap between the pair of collection units 53, or may be positioned at a gap between the pair of sweeping units 51. The pair of collection units 53 and the pair of sweeping units 51 form their respective gaps therebetween, so that the collection driving unit 70 may be positioned on the central vertical plane Po and may be left-right symmetric.

The collection driving unit 70 may include a driving force transmission unit (or driving force transmission assembly) 72 to transmit torque of the motor rotation axis 71s to the sweeping shaft 74. The driving force transmission unit 72 may include a gear and/or a belt, and may include a gear shaft which is a rotation axis of the gear.

The driving force transmission unit 72 may include a worm gear 721 which rotates while being fixed to a motor rotation axis 71s. The driving force transmission unit 72 may include at least one gear 722 which rotates by being engaged with the worm gear 721 by rotation of the worm gear 721. Any one of the at least one gear 722 is fixed to the sweeping shaft 74 to rotate along with the sweeping shaft 74. In one embodiment, the worm gear 721 rotates along with the motor rotation axis 71s, and thus the gear 722 and the sweeping shaft 74 rotate integrally with each other, and the pair of sweeping units 51, which are fixed to both ends of the sweeping shaft 74, rotates along with the gear 722 and the sweeping shaft 74.

The driving force transmission unit 72 may include the sweeping shaft 74, both ends of which are connected to the pair of sweeping units 51 respectively. The sweeping shaft 74 is extended in a left-and-right direction. The sweeping shaft 74 is positioned on the rotation axis Of. The sweeping shaft 74 is positioned between the pair of sweeping units 51.

As illustrated in FIGS. 13 to 17, the water supply module 80 may selectively supply water to the mop module 40. In the drawings, water W filled in the water tank 81 and a water flow WF are illustrated. The water supply module 80 supplies water to the mop module 40 due to the water flow WF. For example, the water supply module 80 may supply water to the module water supply unit 44.

The water supply module 80 may include the water tank 81 that may include a cavity to store water. The water tank 81 is positioned in the body 30. The water tank 81 may be positioned at the rear side of the body 30 to counter the weight of the collection module 50. The water tank 81 and the battery Bt may be provided with a vertical gap formed therebetween.

The water tank 81 may be drawn out of the body 30 from the outside. The water tank 81 may slide rearward of the body 30. While the water tank 81 is mounted in the body 30, a water tank catching portion 84 may be provided, which catches the water tank 81 to the body 30.

The water supply module 80 may include a water tank opening and closing part 82 to open and close the water tank 81. The water tank opening and closing part 82 is positioned on the top surface of the water tank 81. When the water tank

81 is drawn out of the body 30, the water tank opening and closing part 82 may be opened to fill water in the water tank 81.

The water supply module 80 may include a water level display unit (or window) 83 which displays a water level within the water tank 81. The water level display unit 83 may be positioned on an external cover of the water tank 81. The water level display unit 83 may be displayed at a rear surface of the water tank 81. The water level display unit 83 may be made of a transparent material, so that a user may directly view the water level inside the water tank 81.

The water supply module 80 may include a pump 85 which applies pressure to move the water W in the water tank 81 to the mop module 40. The pump 85 is positioned in the body 30. The pump 85 may be positioned on the central vertical plane Po.

Although not illustrated herein, the water supply module may include a valve, in which when the valve is opened, the water in the water tank may be moved to the mop module by the gravity of water without the pump in another embodiment. Although not illustrated herein, the water supply module may include a water-permeable lid in another embodiment. The water-permeable lid is positioned in the supply pipe, such that water passes through the water-permeable lid, while reducing a moving speed of water.

Hereinafter, description will be made based on an embodiment including the pump 85, but is not limited thereto. While the water tank 81 is mounted in the body 30, the water supply module 80 may include a water tank connection portion (or connection pipe) 89 which connects the water tank 81 and the supply pipe 86. The water W in the water tank 81 is introduced into the supply pipe 86 through the water tank connection portion 89.

The water supply module 80 may include the supply pipe 86 which guides movement of the water W from the water tank 81 to the mop module 40. The supply pipe 86 guides movement of the water W by connecting the water tank 81 and the water supply connection portion (or water supply connection channel) 87.

The supply pipe 86 may include: a first supply pipe 861 which guides movement of the water W from the water tank 81 to the pump 85; and a second supply pipe 862 which guides movement of the water W from the pump 85 to the mop module 40. One end of the first supply pipe 861 is connected to the water tank connection portion 89, and the other end thereof is connected to the pump 85. One end of the second supply pipe 862 is connected to the pump 85 and the other end thereof is connected to the water supply connection portion 87.

The second supply pipe 862 may include a common pipe (not shown) which guides movement of relatively upstream water. After passing through the common pipe, water diverges via three direct links (not shown) in a left-and-right direction. The three direct links form a T-shape flow path.

The second supply pipe 862 may include a first diverging pipe 862a which guides movement of the water W to the water supply connection portion 87 of the left module mounting portion 36; and a second diverging pipe 862b which guides movement of the water W to the water supply connection portion 87 of the right module mounting portion 36. One end of the first diverging pipe 862a is connected to the three direct links, and the other end thereof is connected to the water supply connection portion 87 on the left side. One end of the second diverging pipe 862b is connected to the three direct links, and the other end thereof is connected to the water supply connection portion 87 on the right side. Water introduced into the water supply connection portion 87 on the left side is supplied to the left spin mop 41a, and water introduced into the water supply connection portion 87 on the right side is supplied to the right spin mop 41b.

The water supply module 80 may include the water supply connection portion 87 which guides water in the water tank 81 to the mop module 40. Through the water supply connection portion 87, the water W is moved from the body 30 to the mop module 40. The water supply connection portion 87 is positioned below the body 30. The water supply connection portion 87 is positioned at the module mounting portion 36. The water supply connection portion 87 is positioned on the bottom surface of the module mounting portion 36. The water supply connection portion 87 is positioned on a bottom surface portion 361 of the module mounting portion 36. A pair of water supply connection portions 87, corresponding to the pair of spin mops 41a and 41b, are provided. The pair of water supply connection portions 87 are left-right symmetric.

The water supply connection portion 87 protrudes from the module mounting portion 36. The water supply connection portion 87 protrudes downward from the module mounting portion 36. The water supply connection portion 87 is engaged with the water supply corresponding portion 441, which will be described later, of the mop module 40. The water supply connection portion 87 forms a hole which vertically penetrates, and the water moves from the body 30 to the mop module 40 through the hole of the water supply connection portion 87. The water passes through the water supply connection portion 87 and the water supply corresponding portion 441 to move from the body 30 to the mop module 40.

Figure 16:
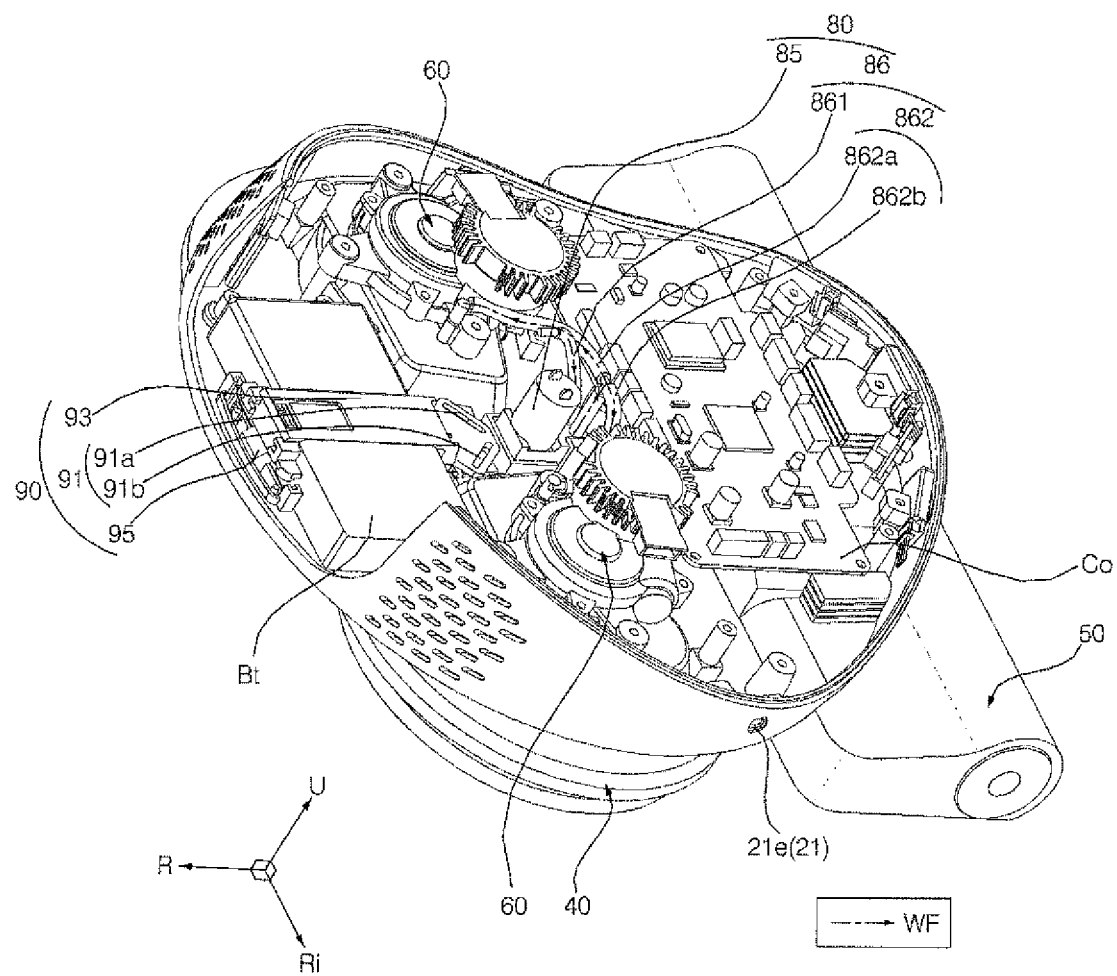
FIG. 16 is a perspective view of the cleaner of FIG. 14 from which a water tank 81 is removed.
Figure 17:
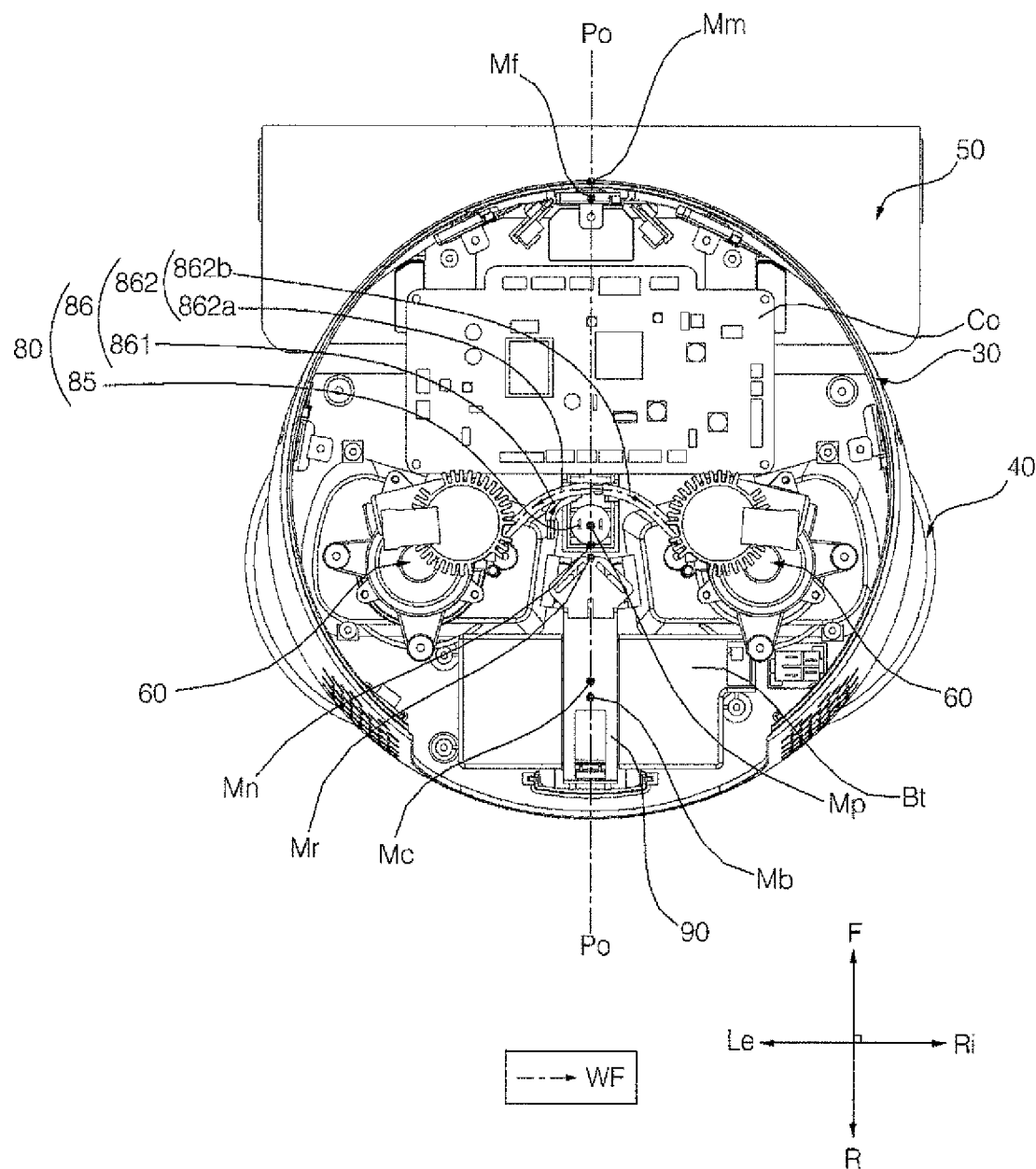
FIG. 17 is a perspective view of the cleaner of FIG. 16, as seen from the top.
Figure 18:
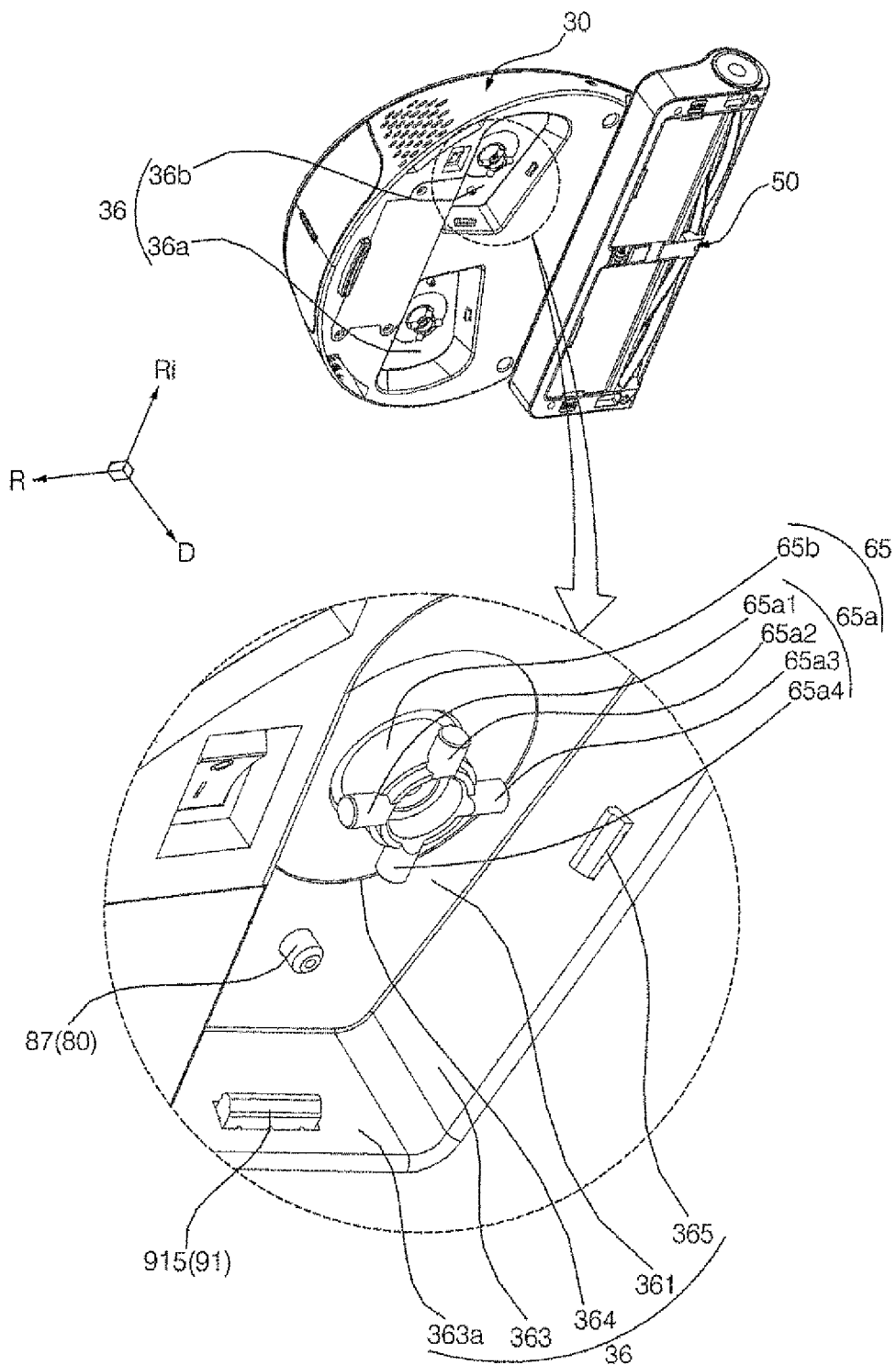
FIG. 18 is a partially enlarged perspective view of a body of FIG. 4.
Figure 19:
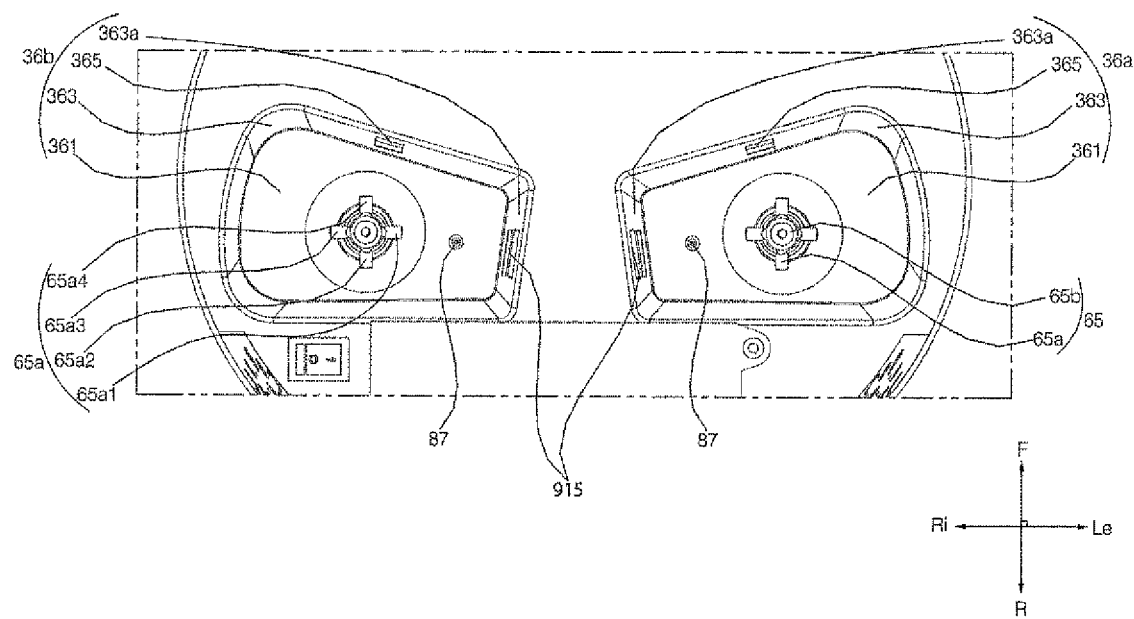
FIG. 19 is a bottom side elevation view of a module mounting portion of the body illustrated in FIG. 18.
Figure 20:
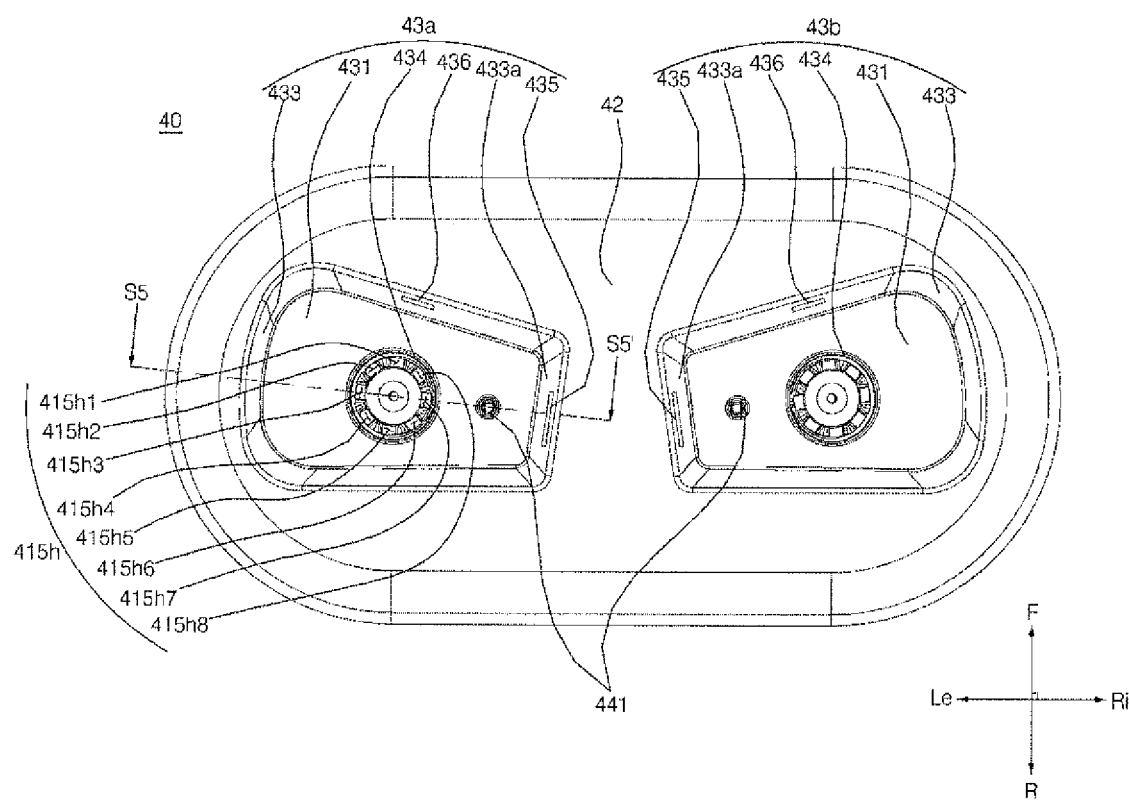
FIG. 20 is a top side elevation view of the mop module illustrated in FIG. 4.
Figure 21:
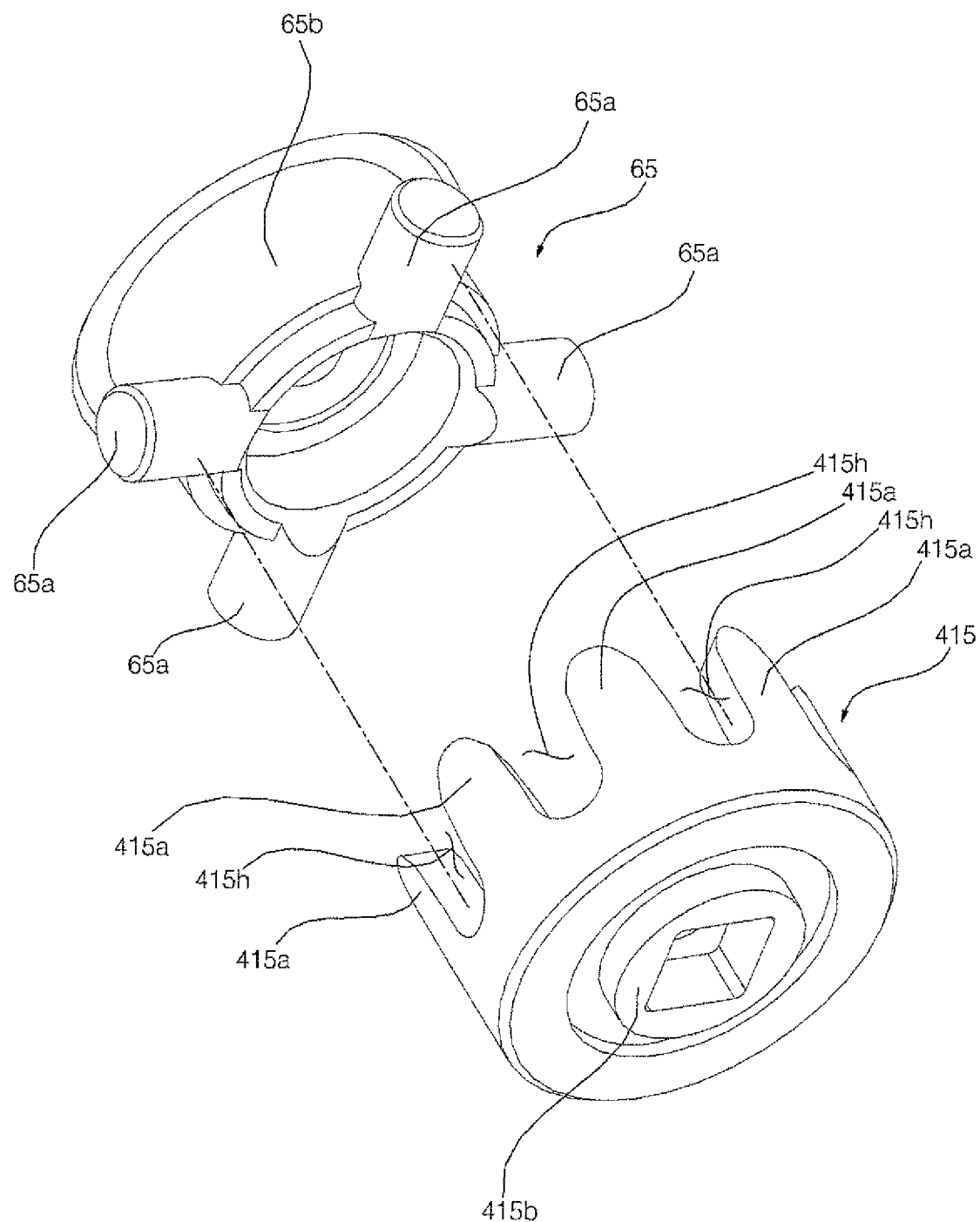
FIG. 21 is an exploded perspective view illustrating a connective relationship between a master joint of the body of FIG. 4 and a slave joint of the mop module of FIG. 20.
Figure 22:
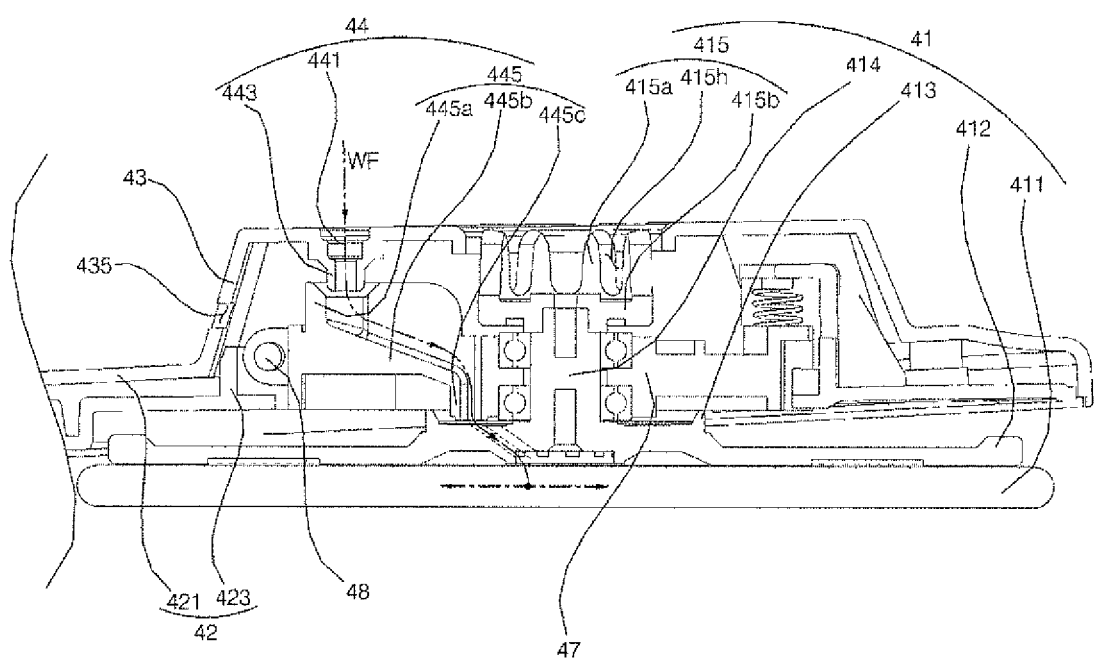
FIG. 22 is a partially cross-sectional view of the cleaner of FIG. 20, vertically taken along line S5-S5' of FIG. 20.

As illustrated in FIGS. 16, 17, and 22, the water flow WF will be described as follows. The pump 85 operates to induce movement of the water W. The water W in the water tank 81 passes through the supply pipe 86 to be introduced into the water supply connection portion 87. The water W in the water tank 81 moves by sequentially passing through the first supply pipe 861 and the second supply pipe 862. The water W in the water tank 81 sequentially passes through the supply pipe 86 and the water supply connection portion 87 to be introduced into the water supply corresponding portion 441 of the mop module 40. The water introduced into the water supply corresponding portion 441 passes through a water supply delivery portion (or water supply delivery channel) 443 and a water supply guiding portion (water supply guiding channel) 445 to be introduced into a water accommodation portion 413. The water introduced into the water accommodation portion 413 passes through a water supply hole 412a to be introduced into a central portion of the rag part 411. The water introduced into the central portion of the rag part 411 moves to the edges of the rag part 411 by a centrifugal force generated by rotation of the rag part 411.

As illustrated in FIGS. 4, 10, 12, and 14 to 17, the cleaner 1 may include a mop driving unit 60 which provides a driving force to rotate the spin mop 41. The mop driving unit 60 provides torque to the pair of spin mops 41a and 41b. The mop driving unit 60 may be left-right symmetric. For example, the mop driving unit 60 may left-right symmetric with respect to the central vertical plane Po.

The mop driving unit 60 is positioned in the body 30. The torque of the mop driving unit 60 is transmitted to the spin mop 41 of the mop module 40. While the body 30 and the mop module 40 are connected, the torque of the mop driving unit 60 is transmitted to the pair of spin mops 41a and 41b.

When the body 30 and the mop module 40 are separated, the torque of the mop driving unit 60 may not be transmitted to the spin mop 41.

The mop module 40 may include a left mop driving unit 60 which provides a driving force to rotate the left spin mop 41a; and a right mop driving unit 60 which provides a driving force to rotate the right spin mop 41b. The pair of mop driving units 60 are left-right symmetric with respect to the central vertical plane Po. Hereinafter, descriptions of elements of one of the mop driving unit 60 may be understood as also describing the elements of another one of the mop driving units 60.

The mop driving unit 60 may include a mop motor 61 which provides torque. The left mop driving unit 60 may include a left mop motor 61a and the right mop driving unit 60 may include a right mop motor 61b. A rotation axis of the mop motor 61 may be vertically extended.

The mop driving unit 60 may also include a driving force transmission unit (or mop transmission) 62 which transmits the torque of the mop motor 61 to a master joint 65. The driving force transmission unit 62 may include a gear and/or a belt, and may include a gear shaft which is a rotation axis of the gear.

The driving force transmission unit 62 may include at least one transmission gear 621. The at least one transmission gear 621 may include a first gear 621a, a second gear 621b, and a third gear 621c. The first gear 621a rotates while being fixed to a rotation axis of the mop motor 61. The first gear 621a is a worm gear. The second gear 621b rotates while being engaged with the first gear 621a. The second gear 621b is a spur gear. The third gear 621c rotates while being engaged with the second gear 621b. The third gear 621c is a worm gear.

The driving force transmission unit 62 may include a shaft gear 622 fixed to the master shaft 624. The shaft gear 622 rotates while being engaged with at least any one transmission gear 621. In one embodiment, the shaft gear 622 rotates while being engaged with the third gear 621c. The shaft gear 622 may rotate integrally with the master shaft 624.

The master shaft 624 rotates about a rotation axis which may be vertically extended. The shaft gear 622 is fixed to an upper end of the master shaft 624. The master joint 65 is fixed to a lower end of the master shaft 624. The master shaft 624 is rotatably supported by the body 30 through a bearing Bb.

In this connected state, the master joint 65 is engaged with the slave joint 415. In the connected state, when the master joint 65 rotates, the slave joint 415 rotates along with the master joint 65. The master joint 65 is exposed downward of the body 30. The master joint 65 is exposed downward of the module mounting portion 36. A pair of master joints 65, which correspond to the pair of spin mops 41a and 41b, may be provided. The pair of master joints 65 is engaged with a corresponding pair of slave joints 415. For example, the master joints 65 may contact and the slave joints 415 when rotating due to friction between the master joints 65 and the slave joints 415. In another example, a lower end surface of the master joint 65 may include a shape (e.g., a protrusion or cavity) that mates with a corresponding shape of an upper end surface of the slave joint 415 to couple the master joint 65 and the slave joint 415.

As illustrated in FIGS. 1 to 4, 6 to 8, and 18 to 24, each configuration of the mop module 40, and the relationship between the mop module 40 and the body 30 will be described as follows. The mop module 40 performs wet-type wiping by using water in the water tank 81. The pair of spin mops 41a and 41b performs wiping by rotating while contacting the floor. The pair of spin mops 41a and 41b may be connected with each other to form a set. When the connected state is changed to the separated state, the pair of spin mops 41a and 41b, which is connected by the mop module 40, may be detached from the body 30. Further, when the separated state is changed to the connected state, the spin mops 41a and 41b, which is connected by the mop module 40, may be integrally connected to the body 30.

As illustrated in FIGS. 3, 4, and 18 to 20, the mop module 40 may be detachably connected to the body 30. The mop module 40 is connected below the body 30. The body 30 is connected above mop module 40. The body 30 may include the module mounting portion (also referred to as a mop housing mounting region or module mounting region) 36, and the mop module 40 may include a body mounting portion (or body mounting region) 43. The body mounting portion 43 may be detachably connected to the module mounting portion 36.

The module mounting portion 36 is provided below the body 30. The body mounting portion 43 is provided above the mop module 40. The module mounting portion 36 is positioned at a bottom surface of the base 32. The body mounting portion 43 is positioned at a top surface of the module housing 42.

Any one of the module mounting portion 36 and the body mounting portion 43 vertically protrudes, and the other one thereof is vertically recessed to be engaged with the any one. In one embodiment shown in the drawings, the body mounting portion 43 protrudes upward from the mop module 40. The body mounting portion 43 is recessed upward from the body 30 to be engaged with the body mounting portion 43.

When viewed from the top, the shape of the body mounting portion 43 may be asymmetric in a forward and backward direction. In this manner, the mop module 40 and the body 30 may be connected to each other in a predetermined direction, since if the mop module 40 is reversely connected to the body 30, the body mounting portion 43 is not shaped to engage the module mounting portion 36.

When viewed from the top, the shape of the body mounting portion 43 may be formed to be elongated in the forward and backward direction further away from the central vertical plane Po. When viewed from the top, the body mounting portion 43 has an inclined shape with a portion relatively far from the central vertical plane Po being adjacent to the front.

The mop module 40 may include a pair of body mounting portions 43a and 43b which are spaced apart from each other. The pair of body mounting portions 43a and 43b correspond to the pair of spin mops 41a and 41b. The pair of body mounting portions 43a and 43b correspond to the pair of module mounting portions 36a and 36b.

The body 30 may include the pair of module mounting portions 36a and 36b which are spaced apart from each other. The pair of module mounting portions 36a and 36b correspond to the pair of body mounting portions 43a and 43b. The pair of body mounting portions 43a and 43b protrudes upward of the mop module 40. The pair of module mounting portions 36a and 36b are recessed upward to be engaged with the pair of body mounting portions 43a and 43b.

The pair of body mounting portions 43a and 43b are horizontally spaced apart from each other. The pair of module mounting portions 36a and 36b are horizontally spaced apart from each other. The pair of body mounting portions 43a and 43b are left-right symmetric with respect to the central vertical plane Po. The pair of module mounting portions 36a and 36b are left-right symmetric with respect to the central vertical plane Po. Hereinafter, descriptions of the body mounting portions 43 may be understood are applicable to each of the pair of body mounting portions 43a and 43b, and descriptions of the module mounting portion 36 may be understood as being applicable of each of the pair of module mounting portions 36a and 36b.

The module mounting portion 36 may include a bottom surface portion 361 which forms a bottom surface of the module mounting portion 36. In the connected state, the bottom surface portion 361 may be positioned adjacent to or contact the top surface portion 431 of the body mounting portion 43. The bottom surface portion 361 faces downward. The bottom surface portion 361 may be formed to be horizontal. The bottom surface portion 361 is positioned above a periphery corresponding portion (or periphery surface) 363.

The module mounting portion 36 may include a periphery corresponding portion 363 positioned along the circumference of the bottom surface portion 361. In the connected state, the periphery corresponding portion 363 contacts a periphery portion (or periphery surface) 433 of the body mounting portion 43. The periphery corresponding portion 363 may be an inclined surface that extends from a bottom surface of the base 32 and to the bottom surface portion 361. The periphery corresponding portion 363 has an inclined portion, of which height becomes higher from the bottom surface of the base 32 toward the bottom surface portion 361. The periphery corresponding portion 363 is positioned to surround the bottom surface portion 361.

The pair of module mounting portions 36 may include a pair of catching surfaces 363a which are inserted into a space between the pair of body mounting portions 43. In the periphery corresponding portion 363 of any one module mounting portion 36, the catching surface 363a may be positioned at a region close to the other adjacent module mounting portion 36. The catching surface 363a is positioned at a region relatively close to the central vertical plane Po in the periphery corresponding portion 363. The catching surface 363a forms a portion of the periphery corresponding portion 363.

The module mounting portion 36 forms a joint hole 364 which exposes at least a portion of the master joint 65. The joint hole 364 is formed at the bottom surface portion 361. The master joint 65 may be positioned by passing through the joint hole 364.

Catching portions (or catching extensions) 915 and 365 which protrude from a surface of any one of the module mounting portion 36 and the body mounting portion 43 may be provided. Catching corresponding portions (or catching cavities) 435 and 436 which are recessed on a surface of the other one of the module mounting portion 36 and the body mounting portion 43 to be engaged with the catching portions 915 and 365 in the connected state, may be provided.

Catching portion 915 which are protruded from a surface of any one of the module mounting portion 36 and the body mounting portion 43 is provided. Catching corresponding portions 435 which are recessed on a surface of the other one of the module mounting portion 36 and the body mounting portion 43 to be engaged with the catching portions 915 in the connected state, are provided.

Catching portions 365 which are protruded from a surface of any one of the module mounting portion 36 and the body mounting portion 43 is provided. Catching corresponding portions 436 which are recessed on a surface of the other one of the module mounting portion 36 and the body mounting portion 43 to be engaged with the catching portions 365 in the connected state, are provided. In one embodiment, the catching portions 915 and 365 are provided on a surface of the module mounting portion 36, and the catching corresponding portions 435 and 436 are provided on a surface of the body mounting portion 43.

The catching portions 915 and 365 may be formed in a hook shape. The catching portions 915 and 365 may be positioned at the periphery corresponding portion 363. The bottom surface of a protruding end portion of the catching portions 915 and 365 is inclined in a manner that gets closer to the top toward an end thereof. The plurality of catching portions 915 and 365 may be provided on one body mounting portion 43.

The catching portions 915 and 365 may include a first catching portion 915 which is elastically movable in a protruding direction. The first catching portion 915 is pressed when the body mounting portion 43 is connected with the module mounting portion 36, but protrudes by a restoring force in the connected state, to be inserted into a first catching corresponding portion 435 of the body mounting portion 43. The first catching portion 915 protrudes by passing through a hole formed on the catching surface 363a.

The catching portions 915 and 365 may include a second catching portion 365 which is fixedly positioned. The second catching portion 365 may protrude from the periphery corresponding portion 363. The second catching portion 365 is fixed to the periphery corresponding portion 363. In the connected state, the second catching portion 365 is inserted into the second catching corresponding portion 436 of the body mounting portion 43.

The body mounting portion 43 may include a top surface portion 431 which forms a top surface. In the connected state, the top surface portion 431 contacts the bottom surface portion 361 of the module mounting portion 36. The top surface portion 431 faces upward. The top surface portion 431 may be formed to be horizontal. The top surface portion 431 is positioned above a periphery portion 433.

The body mounting portion 43 may include the periphery portion 433 positioned along the circumference of the top surface portion 431. The periphery portion 433 contacts the periphery corresponding portion 363 of the module mounting portion 36 in the connected state. The periphery portion 433 forms an inclined surface which extends the top surface of the module housing 42 and the top surface portion 431. The periphery portion 433 has an inclination of which height becomes higher from the top surface of the module housing 42 to the top surface portion 431. The periphery portion 433 is positioned to surround the top surface portion 431.

The body mounting portion 43 may include a catching corresponding surface 433a which contacts the catching surface 363a in the connected state. The pair of body mounting portions 43 may include a pair of catching corresponding surfaces 433a. The pair of catching corresponding surfaces 433a faces each other obliquely in a symmetrical manner. The pair of catching corresponding surfaces 433a is positioned in the middle of the pair of body mounting portions 43.

In the periphery portion 433 of any one body mounting portion 43, the catching corresponding surface 433a is positioned at a region close to the other adjacent body mounting portion 43. The catching corresponding surface 433a is positioned at a region relatively close to the central vertical plane Po in the periphery portion 433. The catching corresponding surface 433a forms a portion of the periphery portion 433.

The body mounting portion 43 forms a driving hole 434 which exposes at least a portion of the slave joint 415. The driving hole 434 is formed at the top surface portion 431. In the connected state, the master joint 65 is inserted into the driving hole 434 to be connected with the slave joint 415.

The catching corresponding portions (or catching recesses) 435 and 436 may be holes or grooves formed on the surface of the body mounting portion 43. The catching corresponding portions 435 and 436 may be positioned at the periphery portion 433. A plurality of catching corresponding portions 435 and 436, which correspond to the plurality of catching portions 915 and 365, may be provided.

The catching corresponding portions 435 and 436 include a first catching corresponding portion 435, on which a first catching portion 915 is caught. The first catching corresponding portion 435 is formed on the catching corresponding surface 433a. The catching corresponding portions 435 and 436 include a second catching corresponding portion 436, on which a second catching portion 365 is caught. The second catching corresponding portion 436 is formed on the periphery portion 433.

The mop module 40 may include at least one spin mop 41. The at least one spin mop 41 may include a pair of spin mops 41. The pair of spin mops 41 are left-right symmetric with respect to a virtual, central vertical plane. The left spin mop 41a and the right spin mop 41b are left-right symmetric.

Figure 6:
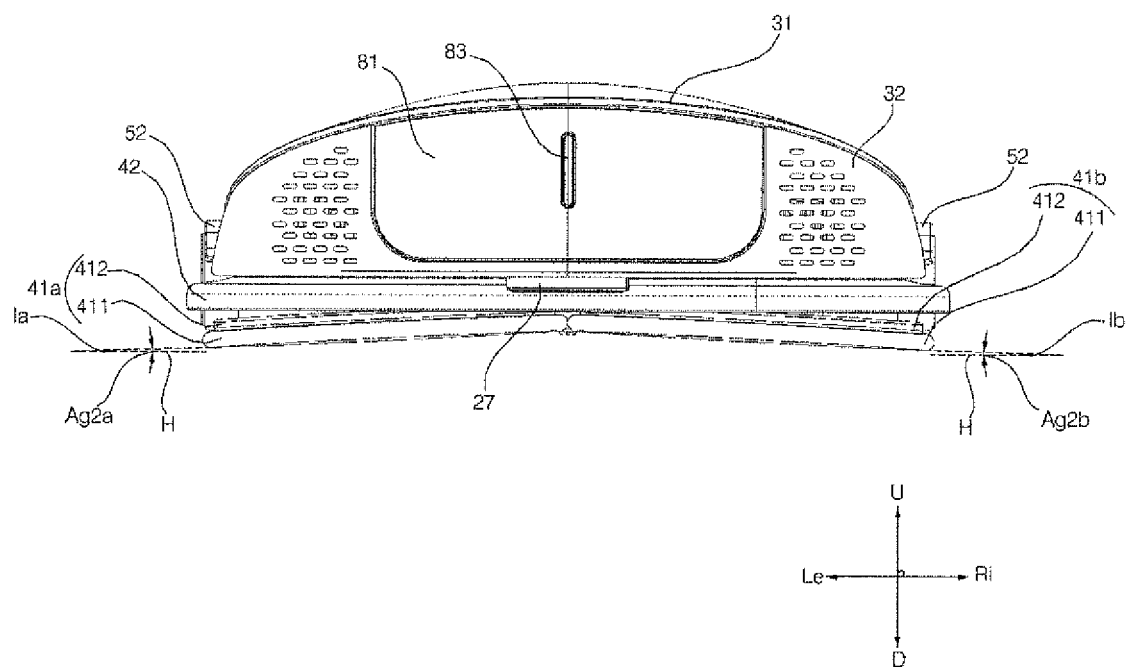
FIG. 6 is an elevation view of the cleaner illustrated in FIG. 1, as seen from the rear side.

FIG. 8 illustrates a point where a spin rotation axis Osa of the left spin mop 41a intersects a bottom surface of the left spin mop 41a, and a point where a spin rotation axis Osb of the right spin mop 41b intersects a bottom surface of the right spin mop 41b. When viewed from the bottom, a clockwise direction of rotation of the left spin mop 41a is defined as a first forward direction w1f, and a counterclockwise direction thereof is defined as a first reverse direction w1r. When viewed from the bottom, a counterclockwise direction of rotation of the right spin mop 41b is defined as a second forward direction w2f, and a clockwise direction thereof is defined as a second reverse direction w2r. Further, when viewed from the bottom, an acute angle formed between an inclination direction of the bottom surface of the left spin mop 40a and a left-and-right direction axis, and an acute angle formed between an inclination direction of the bottom surface of the right spin mop 40b and a left-and-right direction axis, are defined as inclination direction angles Ag1a and Ag1b respectively. The inclination direction angle Ag1a of the left spin mop 41a may be substantially identical to the inclination direction angle Ag1b of the right spin mop 40b. Further, as illustrated in FIG. 6, an angle formed between a virtual horizontal surface H and a bottom surface I of the left spin mop 40a, and an angle formed between a virtual horizontal surface H and a bottom surface I of the right spin mop 40b are defined as inclination angles Ag2a and Ag2b respectively.

As illustrated in FIG. 8, when the left spin mop 41a rotates, a point P1a, to which the largest frictional force is applied from the floor on the bottom surface of the left spin mop 41a is positioned on the left side of the center of rotation Osa of the left spin mop 41a. Greater load may be transmitted to the ground surface at the point P1a than any other point on the bottom surface of the left spin mop 41a, thereby generating the largest frictional force at the point P1a. In the embodiment, the point P1a is positioned on the left front side of the center of rotation Osa; but in another embodiment, the point P1a may be positioned exactly on the left side or on the left rear side of the center of rotation Osa.

As illustrated in FIG. 8, when the right spin mop 41b rotates, a point P1b, to which the largest frictional force is applied from the floor on the bottom surface of the right spin mop 41b, is positioned on the right side of the center of rotation Osb of the right spin mop 41b. Greater load may be transmitted to the ground surface at the point P1b than any other point on the bottom surface of the right spin mop 41b, thereby generating the largest frictional force at the point P1b. In the embodiment, the point P1b is positioned on the right front side of the center of rotation Osb; but in another embodiment, the point P1b may be positioned exactly on the right side or on the right rear side of the center of rotation Osb.

Each of the bottom surface of the left spin mop 41a and the bottom surface of the right spin mop 41b may be inclined. An inclination angle Ag2a of the left spin mop 41a and an inclination angle Ag2b of the right spin mop 41b each form an acute angle. The inclination angles Ag2a and Ag2b are formed at the points P1a and P1b where the largest frictional force is applied, and may be set to be small enough for the entire bottom surface of the rag part 411 to touch the floor by rotation of the left spin mop 41a and the right spin mop 41b.

The bottom surface of the left spin mop 41a has an overall downward inclination formed in the left direction. The bottom surface of the right spin mop 41b has an overall downward inclination in the right direction. As illustrated in FIG. 6, the bottom surface of the left spin mop 41a has the lowest point P1a formed on the left side. The bottom surface of the left spin mop 41a has the highest point Pha formed on the right side. The bottom surface of right spin mop 41b has the lowest point P1b formed on the right side. The bottom surface of the right spin mop 41b has the highest point Phb formed on the left side.

In certain embodiments, the inclination direction angles Ag1a and Ag1b may also be set at 0 degrees. Further, certain embodiments, when viewed from the bottom, the inclination direction of the bottom surface of the left spin mop 120a may form the inclination direction angle Ag1a in a clockwise direction with respect to a left-and-right direction axis. The inclination direction of the bottom surface of the right spin mop 120b may form the inclination direction angle Ag1b in a counterclockwise direction with respect to a left-and-right direction axis. In the embodiment, when viewed from the bottom, an inclination direction of the bottom surface of the left spin mop 120a forms the inclination direction angle Ag1a in a counterclockwise direction with respect to a left-and-right direction axis, and an inclination direction of the bottom surface of the right spin mop 120b forms the inclination direction angle Ag1b in the clockwise direction with respect to a left-and-right direction axis.

The cleaner 1 may move by a frictional force with the ground surface that is generated by the mop module 40. The mop module 40 may generate a 'forward movement frictional force' to move the body 30 forward, or may generate a 'rearward movement frictional force' to move the body rearward. The mop module 40 may generate a 'leftward moment frictional force' to turn the body 30 to the left, or may generate a 'rightward moment frictional force' to turn the body 30 to the right. The mop module 40 may generate a frictional force by combining any one of the forward movement frictional force and the rearward movement frictional force, and any one of leftward moment frictional force and the rightward moment frictional force.

In order to generate the forward movement frictional force, the mop module 40 may rotate the left spin mop 41a in a first forward direction w1f at a predetermined rpm R1, and rotate the right spin mop 41b in a second forward direction w2f at the predetermined rpm R1. In order to generate the rearward movement frictional force, the mop module 40 may rotate the left spin mop 41a in a first reverse direction w1r at a predetermined rpm R2, and rotate the right spin mop 41b in a second reverse direction w2r at the predetermined rpm R2.

In order to generate the rightward moment frictional force, the mop module 40 may rotate the left spin mop 41a in the first forward direction w1f at a predetermined rpm R3; and i) may rotate the right spin mop 41b in the second reverse direction w2r, ii) may halt the right spin mop 41b without rotation, or iii) may rotate the right spin mop 41b in the second forward direction w2f at an rpm R4, which is smaller than the rpm R3.

In order to generate the leftward moment frictional force, the mop module 40 may rotate the right spin mop 41b in the second forward direction w2f at a predetermined rpm R5; and i) may rotate the left spin mop 41a in the first reverse direction w1r, ii) may halt the left spin mop 41a without rotation, or iii) may rotate the left spin mop 41a in the first forward direction w1f at an rpm R6 which is smaller than the rpm R5.

As illustrated in FIGS. 10 and 22 to 24, the mop module 40 may include the pair of spin mops 41a and 41b which are left-right symmetric with respect to the central vertical plane Po. Hereinafter, descriptions of elements of the spin mop 41 may be understood as being applicable to each of the pair of spin mops 41a and 41b.

The spin mop 41 may include a rotary plate 412 which rotates below the body 30. The rotary plate 412 may be formed to be a circular plate member. The rag part 411 is fixed at the bottom surface of the rotary plate 412. The rotary plate 412 rotates the rag part 411. A spin shaft 414 is fixed to a central portion of the rotary plate 412.

The rotary plate 412 may include a rag fixing portion (not shown) which fixes the rag part 411. The rag fixing portion may detachably fix the rag part 411. The rag fixing portion may be a Velcro and the like which is positioned at the bottom of the rotary plate 412. The rag fixing portion may be a hook and the like which is positioned on the edge of the rotary plate 412.

A water supply hole 412a is formed, which vertically penetrates the rotary plate 412. The water supply hole 412a connects a water supply space Sw and the bottom side of the rotary plate 412. Water in the water supply space Sw moves to the bottom side of the rotary plate 412 through the water supply hole 412a. The water in the water supply space Sw moves to the rag part 411 through the water supply hole 412a. The water supply hole 412a is positioned at the central portion of the rotary plate 412. The water supply hole 412a is positioned at a position where it is possible to avoid the spin shaft 414.

The rotary plate 412 may be provided with a plurality of water supply holes 412a. A connection portion 412b is positioned between any two adjacent ones of the plurality of water supply holes 412a. The connection portion 412b connects a portion in a centrifugal direction XO and a portion in a counter-centrifugal direction XI. Here, the centrifugal direction XO is a direction further away from the spin shaft 414, and the counter-centrifugal direction XI is a direction closer to the spin shaft 414.

A plurality of water supply holes 412a may be spaced apart from each other along the circumference of the spin shaft 414. A plurality of water supply holes 412a may be spaced apart from each other at predetermined intervals. A plurality of connection portions 412b may be spaced apart from each other along the circumference of the spin shaft 414. The water supply hole 412a is positioned between the plurality of connection portions 412b.

The rotary plate 412 may include an inclination portion 412d positioned at a bottom end of the spin shaft 414. The water in the water supply space Sw flows by gravity along the inclination portion 412d. The inclination portion 412d is formed along the bottom end of the spin shaft 414. The inclination portion 412d forms a downward inclination in the counter-centrifugal direction XI. The inclination portion 412d may form a bottom surface of the water supply hole 412a.

The spin mop 41 may include the rag part (or rage surface) 411 which is connected to the bottom side of the rotary plate 412 to contact the floor. The rag part 411 may be fixedly coupled to the rotary plate 412, or may be detachably connected. The rag part 411 may be fixed to the rotary plate 412 in a detachable manner by using a Velcro, a hook, or the like. The rag part 411 may include only a rag, or may include a rag and a spacer (not shown). The rag is a portion that directly contacts the floor for wiping. The spacer may be interposed between the rotary plate 412 and the rag to adjust the position of the rag. The spacer may be detachably fixed to the rotary plate 412, and the rag may be detachably fixed to the spacer. The rag 121a may also be detachably fixed to the rotary plate 412 directly without the spacer.

The spin mop 41 may include the spin shaft 414 which rotates the rotary plate 412. The spin shaft 414 is fixed to the rotary plate 412 to transmit torque of the mop driving unit 610 to the rotary plate 412. The spin shaft 414 is connected to the top side of the rotary plate 412. The spin shaft 414 is positioned at the center of an upper portion of the rotary plate 412. The spin shaft 414 is fixed to the center of rotation Osa and Osb of the rotary plate 412. The spin shaft 414 may include a joint fixing portion (or joint fixing end) 414a which fixes the slave joint 415. The joint fixing portion 414a is positioned at a top end of the spin shaft 414.

The spin shaft 414 is extended vertically with respect to the rotary plate 412. A left spin shaft 414 is positioned perpendicular to the bottom surface of the left spin mop 41a. A right spin shaft 414 is positioned perpendicular to the bottom surface of the right spin mop 41b. In one embodiment, the bottom surface of the spin mop 41 is inclined with respect to a horizontal plane, and the spin shaft 414 is inclined with respect to a vertical axis. The spin shaft 414 is inclined in such a manner that the top end thereof is inclined to one side with respect to the bottom end thereof.

The angle of inclination of the spin shaft 414 with respect to the vertical axis may be changed according to rotation of the tilting frame 47 about the tilting shaft 48. The spin shaft 414 is rotatably connected to the tilting frame 47 to be integrally inclined with the tilting frame 47. When the tilting frame 47 is inclined, the spin shaft 414, the rotary plate 412, the water accommodation portion 413, the slave joint 415, and the rag part 411 are inclined integrally with the tilting frame 47.

The mop module 40 may include the water accommodation portion (or water accommodation recess) 413 which may be positioned above the rotary plate 412 to accommodate water. The water accommodation portion 413 forms a water supply space Sw which stores water. The water accommodation portion 413 surrounds the spin shaft 414, but is spaced apart therefrom to form the water supply space Sw. The water accommodation portion 413 enables water, supplied to the top side of the rotary plate 412, to be collected in the water supply space Sw before the water passes through the water supply hole 412a. The water supply space Sw is positioned at a top central portion of the rotary plate 412. The water supply space Sw has a cylinder volume.

The top portion of the water supply space Sw is open, so that water is introduced into the water supply space Sw through the open top portion.

The water accommodation portion 413 protrudes upward from the rotary plate 412. The water accommodation portion 413 is extended along the circumference of the spin shaft 414. The water accommodation portion 413 may be a ring type rib. The water supply hole 412a is positioned on an inner bottom surface of the water accommodation portion 413. The water accommodation portion 413 is spaced apart from the spin shaft 414. The bottom end of the water accommodation portion 413 is fixed to the rotary plate 412. The top end of the water accommodation portion 413 has a free, open end.

As illustrated in FIGS. 10 and 18 to 23, the connection between the master joint 65 and the slave joint 415 will be described as follows. The mop driving unit 60 may include the master joint 65 which rotates by the mop motor 61. The spin mop 41 may include the slave joint 415 which rotates by being engaged with the master joint 65 in the connected state. The master joint 65 is exposed to the outside of the body 30. At least a portion of the slave joint 415 is exposed to the outside of the mop module 40.

Figure 3:
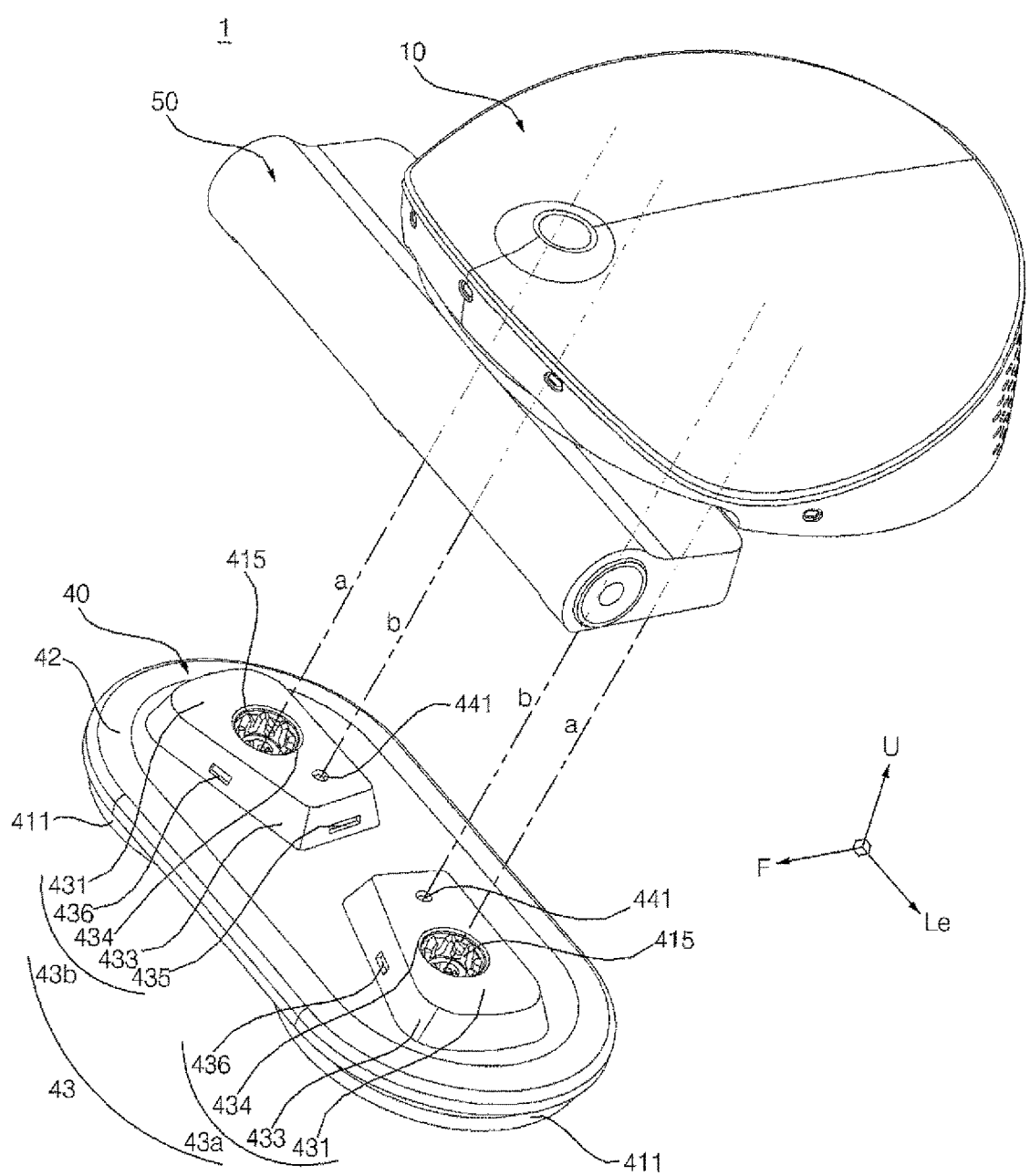
FIG. 3 is an exploded perspective view of a body and a mop module illustrated in FIG. 1.
Figure 4:
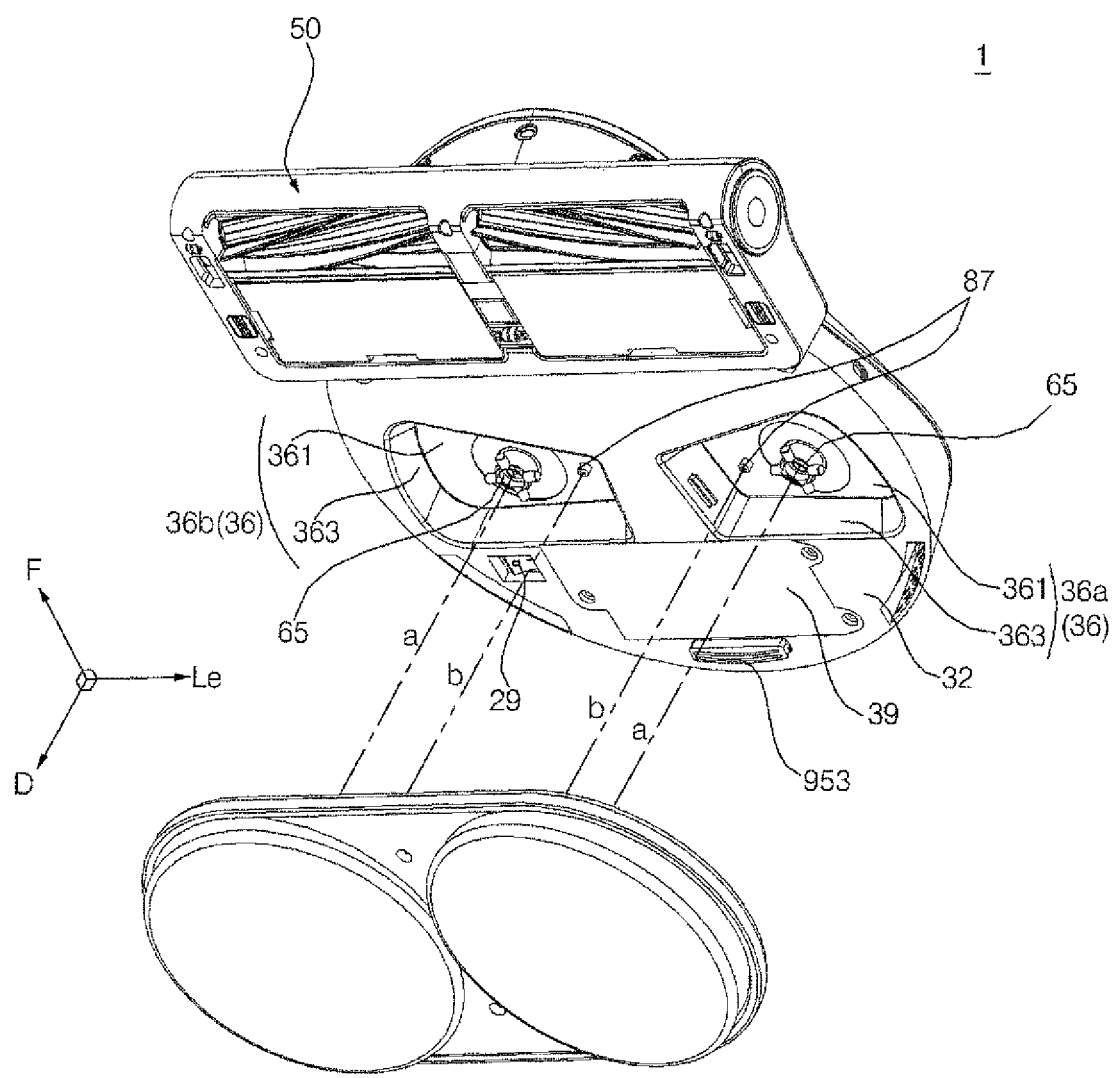
FIG. 4 is an exploded perspective view of the body and the mop module illustrated in FIG. 1, as seen from a different angle.
Figure 5:
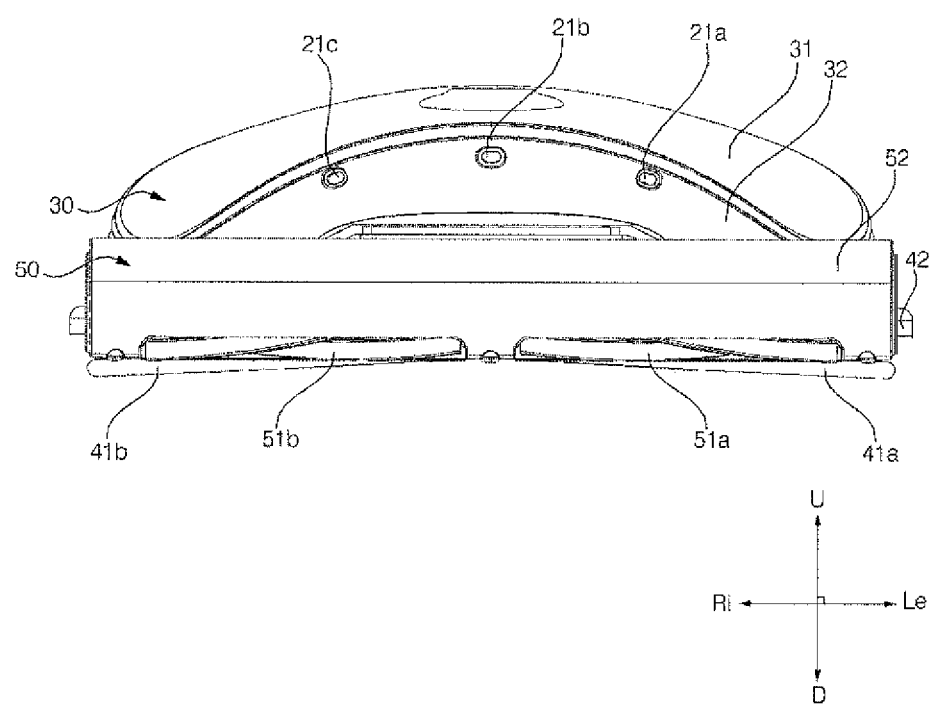
FIG. 5 is an elevation view of the cleaner illustrated in FIG. 1, as seen from the front side.

As illustrated by dotted lines a in FIGS. 3 and 4, the master joint 65 and the slave joint 415 are separated from each other in the separated state; and in the connected state, the master joint 65 and the slave joint 415 are engaged with each other. Any one of the master joint 65 and the slave joint 415 may include a plurality of driving protrusions 65a which are positioned in a circumferential direction with respect to a rotation axis of the any one; and the other one thereof may include a plurality of driving grooves 415h which are positioned in a circumferential direction with respect to a rotation axis of the other one.

The plurality of driving protrusions 65a are spaced apart from each other at predetermined intervals. The plurality of driving grooves 415h are spaced apart from each other at predetermined intervals. In the connected state, the driving protrusion 65a is inserted into the driving groove 415h. In the separated state, the driving protrusion 65a is separated from the driving groove 415.

In one embodiment, the number of the plurality of driving grooves 415h is greater than the number of the plurality of driving protrusions 65a. The number of the plurality of driving protrusions 65a may be n, and the number of the plurality of driving grooves 415h may be n*m (value obtained by multiplying n and m), where "n" is a natural number equal to or greater than 2, and "m" is a natural number equal to or greater than 2. In the embodiment, four driving protrusions 65a1, 65a2, 65a3, and 65a4, which are spaced apart from each other at predetermined intervals, are provided; and eight driving grooves 415h1, 415h2, 415h3, 415h4, 415h5, 415h6, 415h7, and 415h8, which are spaced apart from each other at predetermined intervals, are provided.

Any one of the master joint 65 and the slave joint 415 may include the plurality of driving protrusions 65a which are spaced apart from each other in a circumferential direction with respect to a rotation axis of the any one thereof. And, the other one of the master joint 65 and the slave joint 415 may include a plurality of opposing protrusions 415a which are spaced apart from each other in a circumferential direction with respect to a rotation axis of the other one thereof. The plurality of opposing protrusions 415a protrude in a direction the any one of the master joint 65 and the slave joint 415.

The plurality of opposing protrusions 415a are spaced apart from each other at predetermined intervals. In the connected state, any one driving protrusion 65a is positioned between two adjacent opposing protrusions 415a. In the separated state, the driving protrusion 65a is separated from a space between two adjacent opposing protrusions 415a. In the connected state, at least one opposing protrusion 415a is positioned between two adjacent driving protrusions 65a. In the embodiment, in the connected state, two opposing protrusions 415a are positioned between two adjacent driving protrusions 65a.

A protruding end of the opposing protrusion 415a may be formed to be rounded. For example, the protruding end of the opposing protrusion 415a may be formed to be rounded in an arrangement direction of the plurality of opposing protrusions 415a. The protruding end of the opposing protrusions 415a has a corner portion which is rounded toward adjacent opposing protrusions 415a with respect to a central axis of the protruding direction. In this manner, when the separated state is changed to the connected state, the driving protrusion 65a may smoothly move along the rounded protruding end of the opposing protrusion 415a to be inserted into the driving groove 415h.

The number of the plurality of opposing protrusions 415a may be greater than the number of the plurality of driving protrusions 65a. The number of the plurality of driving protrusions 65a may be n, and the number of the plurality of opposing protrusions 415a may be n*m (value obtained by multiplying n and m), where "n" is a natural number equal to or greater than 2, and "m" is a natural number equal to or greater than 2. In the embodiment, four driving protrusions 65a1, 65a2, 65a3, and 65a4, which are spaced apart from each other at predetermined intervals, are provided; and eight opposing protrusions 415a, which are spaced apart from each other at predetermined intervals, are provided.

In the embodiment, the master joint 65 may include the driving protrusion 65a, and the slave joint 415 forms the driving groove 415h. In the embodiment, the slave joint 415 may include the opposing protrusion 415a. Hereinafter, description will be made based on the embodiment.

The master joint 65 is fixed to a bottom end of the master shaft 624. The master joint 65 may include a driving protrusion axis 65b which is fixed to the mater shaft 624. The driving protrusion axis 65b may be formed in a cylindrical shape. The driving protrusion 65a protrudes from the driving protrusion axis 65b. The driving protrusion 65a protrudes in a direction further away from a rotation axis of the master joint 65. The driving protrusions 65a are spaced apart from each other in a circumferential direction of the driving protrusion axis 65b. The driving protrusion 65a may have a circular cross-section, and may protrude in a direction further away from the master joint 65.

The slave joint 415 is fixed to the top end of the spin shaft 414. The slave joint 415 may include a slave shaft portion 415b which is fixed to the spin shaft 414. The slave shaft portion 415b may be formed in a cylindrical shape. The driving groove 415h is formed at a front portion of a circumference of the slave shaft portion 415b. The driving groove 415h is vertically recessed. A plurality of driving grooves 415h are spaced apart from each other along the circumference of the slave shaft portion 415h. The slave joint 415 may include an opposing protrusion 415a which protrude from the slave shaft portion 415b. The opposing protrusion 415a protrudes from the slave shaft portion 415b toward the master joint 65 in a vertical direction.

In the embodiment, the opposing protrusion 415a protrudes upward. The opposing protrusion 415a forms the protruding end upward. The opposing protrusion 415a forms a rounded protruding end. When the separated state is changed to the connected state, and a surface of the driving protrusion 65a contacts the rounded end of the opposing protrusion 415a, the driving protrusion 65a naturally slides to be inserted into the driving groove 415h. The opposing protrusion 415a is positioned forward of the slave shaft portion 415b. The plurality of opposing protrusions 415a and the plurality of driving grooves 415h are alternately positioned along the circumference of the slave shaft portion 415b.

In the connected state, when the suspension units 47, 48, and 49, which will be described later, are freely movable within a predetermined range, the driving protrusion 65a and the driving groove 415h are movable but are engaged with each other to transmit torque. Specifically, a vertical depth of the driving groove 415h is formed to be greater than a vertical width of the driving protrusion 65a, such that even when the driving protrusion 65a freely moves in the driving groove 415h within the predetermined range, the torque of the master joint 65 may be transmitted to the slave joint 415.

A module housing 42 connects the pair of spin mops 41a and 41b. The pair of spin mops 41a and 41b are integrally detached from, and integrally connected to, the body 30 by the module housing 42. The body mounting portion 43 is positioned above the module housing 42. The spin mop 41 may be rotatably supported by the module housing 42. The spin mop 41 may be positioned by passing through the module housing 42.

The module housing 42 may include a top cover 421 which forms a top portion of the module housing 42, and a bottom cover 423 which forms a bottom portion. The top cover 421 and the bottom cover 423 are connected with each other. The top cover 421 and the bottom cover 423 form an inner space to partially accommodate the spin mop 41.

The suspension units 47, 48, and 49 may be positioned at the module housing 42. The suspension units 47, 48, and 49 may be positioned in the inner space formed by the top cover 421 and the bottom cover 423. The suspension units 47, 48, and 49 support the spin shaft 414 in a manner that enables the spin shaft 414 to be vertically movable within a predetermined range. According to the present disclosure, the suspension units 47, 48, and 49 may include a tilting frame 47, a tilting shaft 48, and an elastic member 49.

The module housing 42 may include a limit, which limits a rotation range of the tilting frame 47. The limit may include a bottom limit 427, which limits a range of downward rotation of the tilting frame 47. The bottom limit 427 may be positioned in the module housing 42. The bottom limit 427 is provided to contact a bottom limit contacting portion 477 when the tilting frame 47 rotates as downward as possible. When the cleaner 1 is normally positioned on an external horizontal plane, the bottom limit contacting portion 477 is spaced apart from the bottom limit 427. With no power being provided to push upward from a bottom surface of the spin mop 41, the tilting frame 47 rotates to a maximum angle, the bottom limit contacting portion 477 contacts the bottom limit 427, and the inclination angles Ag2a and Ag2b becomes the largest.

The limit may include a top limit (not shown), which limits a range of upward rotation of the tilting frame 47. In the embodiment, as the master joint 65 and the slave joint 415 are attached to each other, the range of upward rotation of the tilting frame 47 may be limited. When the cleaner 1 is normally positioned on an external horizontal plane, the master joint 65 and the slave joint 415 are attached to each other to the maximum, and the inclination angles Ag2a and Ag2b becomes the smallest.

The module housing 42 may include a second supporting portion 425 which fixes an end portion of the elastic member 49. When the tilting frame 47 rotates, the elastic member 49 is elastically deformed or elastically restored by a first supporting portion 475, which is fixed to the tilting frame 47, and a second supporting portion 425 which is fixed to the module housing 42.

The module housing 42 may include a tilting shaft supporting portion 426 which supports the tilting shaft 48. The tilting shaft supporting portion 426 supports both ends of the tilting shaft 48.

Figure 23:
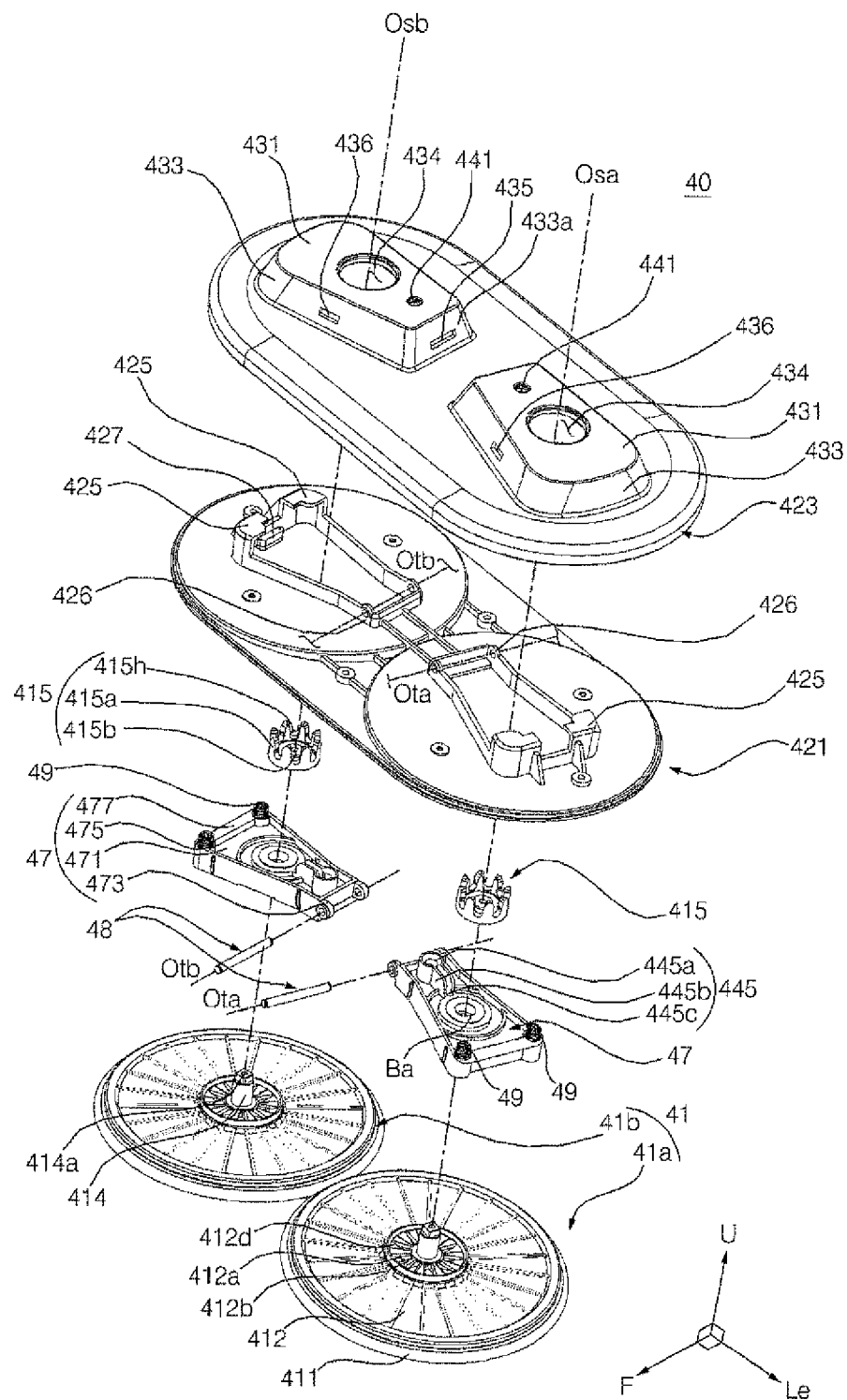
FIG. 23 is an exploded perspective view of the mop module illustrated in FIG. 20.
Figure 24:
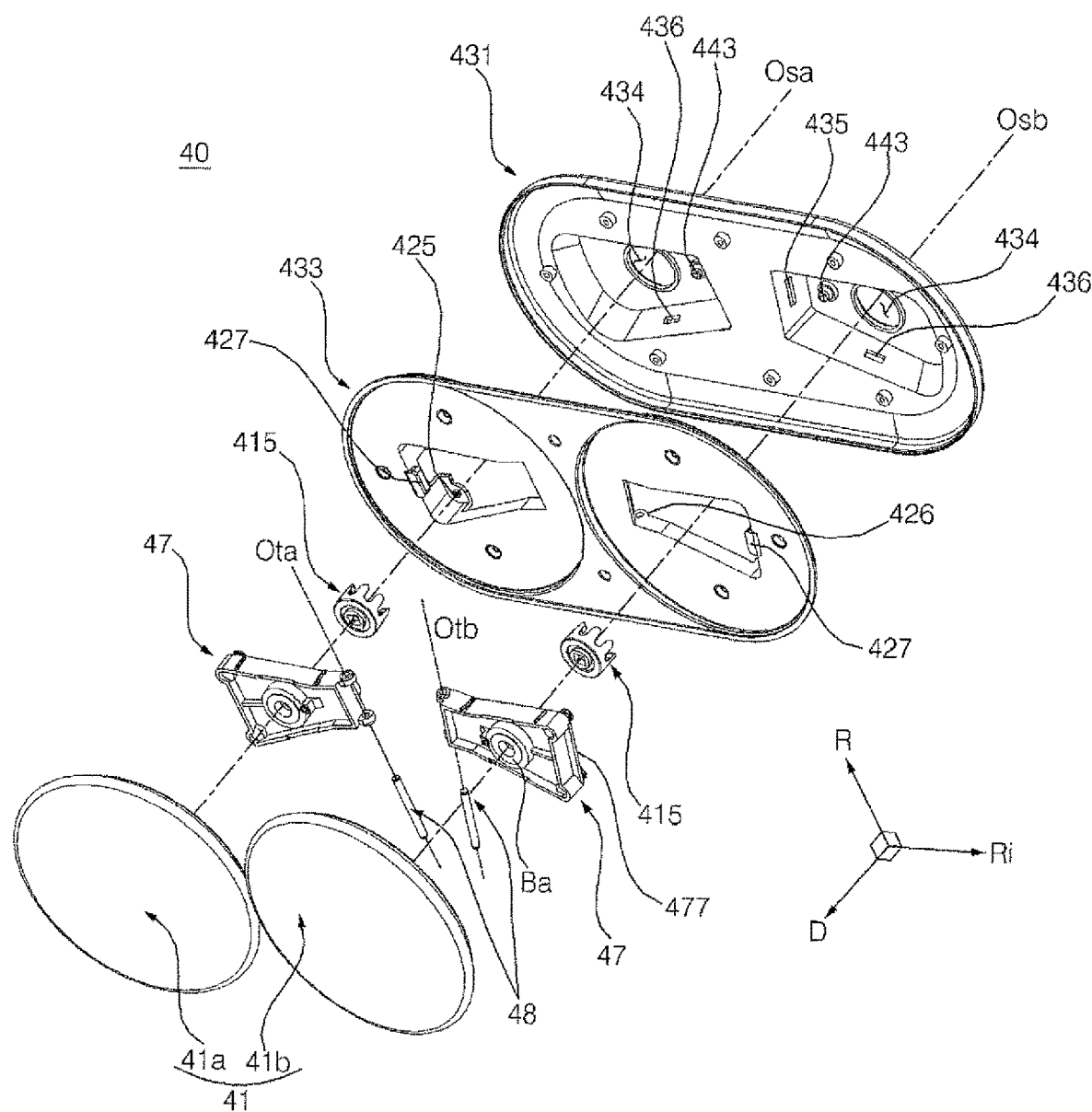
FIG. 24 is an exploded perspective view of the mop module illustrated in FIG. 23, as seen from a different angle.

As illustrated in FIGS. 22 to 24, the mop module 40 may include a module water supply unit 44 which guides water, introduced from the water supply connection portion, into the spin mop 41. The module water supply portion (or module water supply channel) 44 guides water from upward to downward. A pair of module water supply portions 44, which correspond to the pair of spin mops 41a and 41b, may be provided. The water W in the water tank 81 is supplied to the spin mop 41 through the module water supply portion 44. The water W in the water tank 81 is introduced into the module water supply portion 44 through the water supply connection portion 87.

The module water supply portion 44 may include a water supply corresponding portion (or a water supply corresponding channel) 441 to receive water from the water supply module 80. The water supply corresponding portion 441 is connected with the water supply connection portion 87. The water supply corresponding portion 441 forms a groove into which the water supply connection portion 87 is inserted. The water supply corresponding portion 441 is positioned in the body mounting portion 43. The water supply corresponding portion 441 is positioned at the top surface portion 431 of the body mounting portion 43. The water supply corresponding portion 441 is formed by a downwardly recessed surface of the body mounting portion 43.

In the connected state, the water supply corresponding portion 441 is formed at a position corresponding to the water supply connection portion 87. In the connected state, the water supply connection portion 87 is connected with the water supply corresponding portion 441 by being engaged with each other. In the connected state, the water supply connection portion 87 is inserted from below into the water supply corresponding portion 441. In the separated state, the water supply connection portion 87 and the water supply corresponding portion are separated from each other (see dotted line b in FIGS. 3 and 4).

The module water supply portion 44 may include a water supply delivery portion 443 which guides water, introduced into the water supply corresponding portion 441, into the water supply guiding portion 445. The water supply delivery portion 443 may be positioned in the module housing 42. The water supply delivery portion 443 may protrude downward on an inner top surface of the top cover 421. The water supply delivery portion 443 may be positioned below the water supply corresponding portion 441. The water supply delivery portion 443 may be provided to flow water downward. The water supply corresponding portion 441 and the water supply delivery portion 443 may form a hole which vertically penetrates, and water flows downward through the hole.

The module water supply portion 44 may include the water supply guiding portion 445 which guides water, introduced into the water supply corresponding portion 441, to the spin mop 41. The water, introduced into the water supply corresponding portion 441, is introduced into the water supply guiding portion 445 through the water supply delivery portion 443.

The water supply guiding portion 445 is positioned at the tilting frame 47. The water supply guiding portion 445 is fixed to the frame base 471. The water is introduced through the water supply corresponding portion 441 and the water supply delivery portion 443 into a space formed by the water supply guiding portion 445. The water supply guiding portion 445 may minimize dispersion of water, thereby inducing all drops of water to be introduced into the water accommodation portion 413.

The water supply guiding portion 445 may include an introduction portion 445a forming a space which is recessed downward from above. The introduction portion 445a may accommodate a bottom end of the water supply delivery portion 443. The introduction portion 445a may form a space having an open top portion. After passing through the water supply delivery portion 443, the water is introduced through the open top portion of the space of the introduction portion 445a. The space of the introduction portion 445a has one side which is connected with a flow passage having a flow passage portion 445b formed at one side.

The water supply guiding portion 445 may include the flow passage portion 445b which connects the introduction portion 445a and an discharge portion 445c. One end of the flow passage portion 445b is connected with the introduction portion 445a, and the other end of the flow passage portion 445b is connected with the discharge portion 445c. The space formed by the flow passage portion 445b is a flow passage of water. The space of the flow passage portion 445b communicates with the space of the introduction portion 445a. The flow passage portion 445b may be formed of a channel type having an open top portion. The flow passage portion 445b may have an inclined portion, of which height is lowered from the introduction portion 445a to the discharge portion 445c.

The water supply guiding portion 445 may include the discharge portion 445c which discharges water into the water supply space Sw of the water accommodation portion 413. A bottom end of the discharge portion 445c may be positioned in the water supply space Sw. The discharge portion 445c forms a hole which connects an inner space of the module housing 42 and an upper space of the rotary plate 412. The hole of the discharge portion 445c vertically connects the two spaces. The discharge portion 445c forms a hole which vertically penetrates the tilting frame 47. The space of the flow passage portion 445b communicates with the hole of the discharge portion 445c. A bottom end of the discharge portion 445c may be positioned inside the water supply space Sw of the water accommodation portion 413.

The tilting frame is connected with the module housing 42 through the tilting shaft 48. The tilting frame 47 rotatably supports the spin shaft 414. The tilting frame 47 is provided to be rotatable about tilting rotation axes Ota and Otb within a predetermined range. The tilting rotation axes Ota and Otb are extended in a direction transverse to the rotation axes Osa and Osb of the spin shaft 414. The tilting shaft 48 is positioned on the tilting rotation axes Ota and Otb. The left tilting frame 47 is provided to be rotatable about the tilting rotation axis Ota within a predetermined range. The right tilting frame 47 is provided to be rotatable about the tilting rotation axis Otb within a predetermined range.

The tilting frame 47 is provided to be inclined with respect to the mop module 40 within a predetermined angle range. Inclination angles Ag2a and Ag2b of the tilting frame 47 may be changed according to floor states. The tilting frame 47 may perform a function of suspension (supporting weight while reducing vertical vibration) of the spin mop 47.

The tilting frame 47 may include a frame base 471 which forms a bottom surface. The spin shaft 414 is positioned to vertically penetrate the frame base 471. The frame base 471 may be formed in a plate shape which has a thickness in a vertical direction. The tilting shaft 48 connects the module housing 42 and the frame base 471 in a rotatable manner.

A bearing Ba may be provided between a rotation axis supporting portion 473 and the spin shaft 414. The bearing Ba may include a first bearing B1, which is positioned at the bottom, and a second bearing B2 which is positioned at the top.

A bottom end of the rotation axis supporting portion 473 is inserted into the water supply space Sw of the water accommodation portion 413. An inner circumferential surface of the rotation axis supporting portion 473 supports the spin shaft 414.

The tilting frame 47 may include a first supporting portion 475 which supports one end of the elastic member 49. The other end of the elastic member 49 is supported by a second supporting portion 425 positioned in the module housing 42. When the tilting frame 47 is inclined with respect to the tiling shaft 48, a position of the first supporting portion 475 is changed, and the length of the elastic member 49 is changed.

The first supporting portion 475 is fixed to the tilting frame 47. The first supporting portion 475 is positioned at the left side of the left tilting frame 47. The first supporting portion 475 is positioned at the right side of the right tilting frame 47. The second supporting portion 425 is positioned at a left region of the left spin mop 41a. The second supporting portion 425 is positioned at a right region of the right spin mop 41b.

The first supporting portion 475 is fixed to the tilting frame 47. The first supporting portion 475 is inclined along with the tilting frame 47 when the tilting frame 47 is inclined. In the case where the inclination angles Ag2a and Ag2b are the smallest, the distance between the first supporting portion 475 and the second supporting portion 425 is the shortest. In the case where the inclination angles Ag2a and Ag2b are the largest, the distance between the first supporting portion 475 and the second supporting portion 425 is the longest. When the inclination angles Ag2a and Ag2b are the shortest, the elastic member 49 is elastically deformed and provides a restoring force.

The tilting frame 47 may include a bottom limit contacting portion 477 which is provided to contact the bottom limit 427. The bottom surface of the bottom limit contacting portion 477 may contact the top surface of the bottom limit 427.

The tilting shaft 48 is positioned in the module housing 42. The tilting shaft 48 is a rotation axis of the tilting frame 47. The tilting shaft 48 may be extended in a direction perpendicular to an inclination direction of the spin mop 41. The tilting shaft 48 may be extended in a horizontal direction. In the embodiment, the tilting shaft 48 is extended from a forward and backward direction to a direction inclined at an acute angle.

The elastic member 49 applies an elastic force to the tilting frame 47. The elastic member 49 applies the elastic force to the tilting frame 47 so that the inclination angles Ag2a and Ag2b of the bottom surface of the spin mop 41 may increase.

The elastic member 49 is provided to stretch (or extend) when the tilting frame 47 rotates downward, and to shrink when the tilting frame 47 rotates upward. The elastic member 49 enables the tilting frame 47 to act in a shock-absorbing (elastic) manner. The elastic member 49 applies a moment force to the tilting frame 47 in a manner that increases the inclination angles Ag2a and Ag2b.

Figure 15:
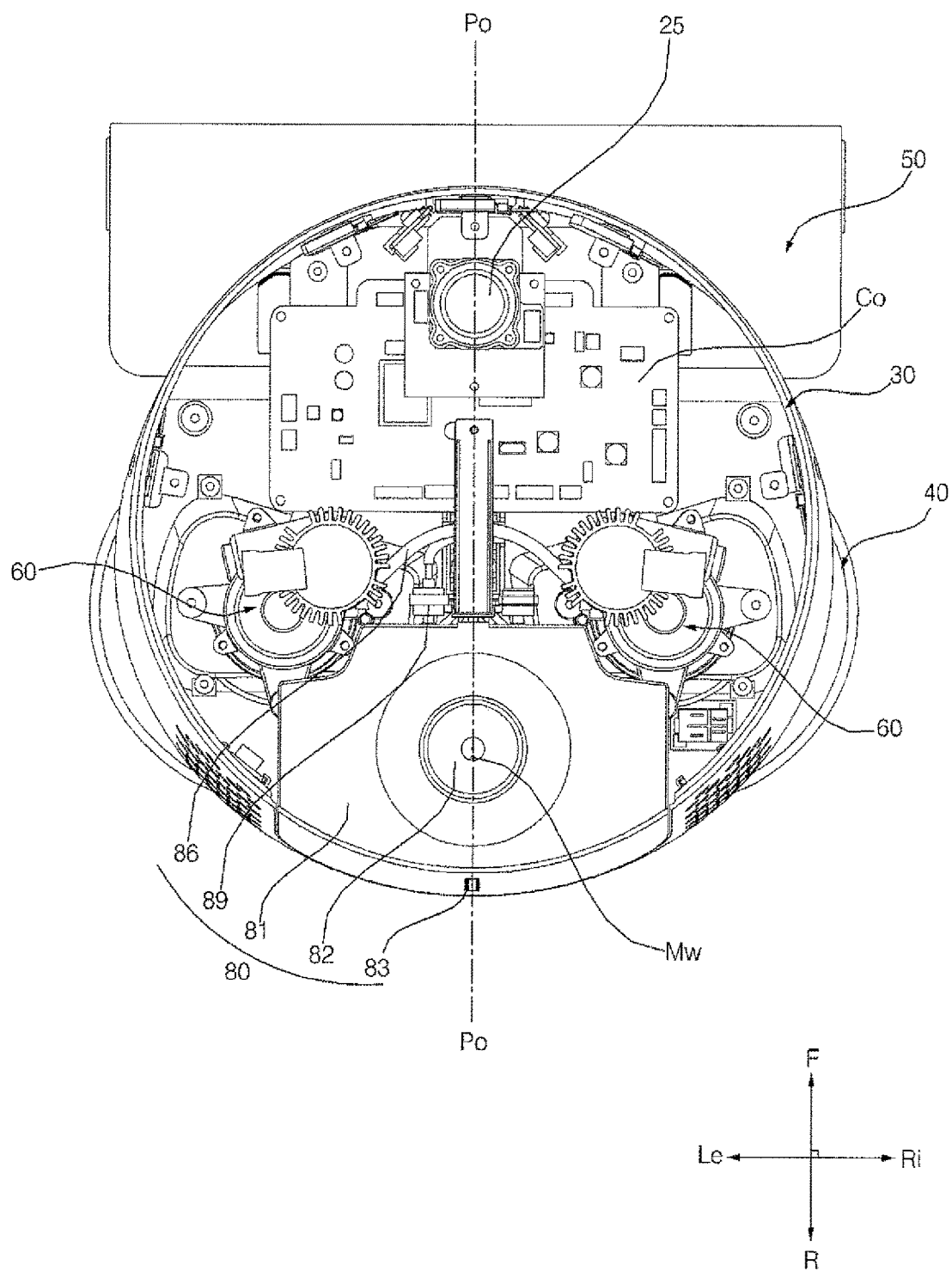
FIG. 15 is an elevation view of the cleaner illustrated in FIG. 14, as seen from the top side.

As illustrated in FIGS. 15 and 17, the center of mass Mw of the water tank lies on the central vertical plane Po. The center of mass Mw of the water tank 81 is positioned behind the points Pla and Plb on which the largest frictional force acts. The center of mass of a battery Mb lies on the central vertical plane Po. The center of mass Mb of the battery Bt is positioned behind the points Pla and Plb on which the largest frictional force acts.

Further, the center of mass Mp of a pump lies on the central vertical plane Po. The center of mass Mp of the pump is positioned between the pair of spin mops 41a and 41b. The center of mass Mc of the detachable module 90 lies on the central vertical plane Po. The center of mass Mc of the detachable module 90 is positioned behind the center of mass Mp of the pump.

The center of mass Mr of the mop module 40 lies on the central vertical plane Po. The pair of spin mops 41a and 41b are left-right symmetric. The center of mass of the pair of spin mops 41a and 41b lie on the central vertical plane Po.

The center of mass Mn of the mop driving unit 60 lies on the central vertical plane Po. The pair of mop driving units 60 are left-right symmetric. The center of mass Mn of the mop driving unit 60 is positioned between the pair of spin mops 41a and 41b.

The center of mass Mf of the collection module 50 lies on the central vertical plane Po. The collection module 50 may be left-right symmetric. The center of mass of the pair of sweeping units 51 may lie on the central vertical plane Po. The pair of sweeping units 51 may be left-right symmetric. The pair of collection units 53 may be left-right symmetric. The center of mass of the pair of sweeping units 51 may lie on the central vertical plane Po.

The center of mass Mm of the collection driving unit 70 lies on the central vertical plane Po. The collection driving unit 70 may be left-right symmetric with respect to the central vertical plane Po.

A first aspect of the present application increases a frictional force between a rag and a floor surface so that a cleaner may wipe and travel effectively. A second aspect of the present application improves stability in leftward and rightward and forward and backward traveling of a robot cleaner in comparison to other robot cleaners that are typically supported at two points by a pair of rags provided on the left side and the right side, thereby reducing the stability of these robot cleaners in forward and backward traveling.

A third aspect of the present application relates to providing consistent friction against a floor surface by the spinning mops in comparison to another robot cleaner which travels by a pair of rotating rag surfaces provided on the left side and the right side, such that a frictional force generated by the pair of rotating rag surfaces frequently changes and the robot cleaner has difficulty moving straight. When the robot cleaner has difficulties moving straight, the cleaner may by pass an area to be cleaned, such as a surface near a wall, where the robot cleaner is required to move straight.

If the robot cleaner is supported by more than two supporting points, load is distributed to the plurality of supporting points. In this case, however, there is a problem in that a frictional force generated by the action of some of the plurality of supporting points is reduced due to load distribution, which reduces traveling performance of the robot cleaner. Thus, a fourth aspect of the present application improves traveling performance while securing stability.

A fifth aspect the present application reduces occurrences of eccentric movement (for example, a case where the robot cleaner performs curved traveling, which is different from a controlled command signal), which occurs unexpectedly as the center of gravity is leaned to one side when the robot cleaner travels by a pair of rags on the left side and the right side.

A sixth aspect of the present application solves a problem that when the robot cleaner performs wiping, relatively large foreign substances are difficult to be attached to a rag surface and may remain on the floor even after the wiping. A seventh aspect of the present application provides a cleaner which may perform both wet-type and dry-type wiping, thereby enabling the cleaner to perform clean and efficient wiping.

In order to achieve the above aspects of the present application, a cleaner may include a mop module having a pair of spin mops that contacts a floor while rotating clockwise or counterclockwise when viewed from a top and is left-right symmetric with a virtual central vertical plane. Further, the cleaner may include a collection module that collects foreign substances from the floor at a position spaced apart from the mop module in a forward and backward direction. The collection module may include at least one collection unit that forms a collection space which stores the collected foreign substances. The at least one collection unit is left-right symmetric with respect to the central vertical plane. In addition, the cleaner may include a body which is disposed to connect the mop module and the collection module. The collection module further may include at least one sweeping unit which contacts the floor while rotating to suck the foreign substances from the floor into the collection space. And, the at least one sweeping unit is left-right symmetric with respect to the central vertical plane. The cleaner further may include a collection driving unit which provides torque to the pair of sweeping units. And, the collection driving unit is left-right symmetric with respect to the central vertical plane.

The collection module may include: a module cabinet which forms a bottom surface facing the floor; and at least one auxiliary wheel is configured to make the floor and the bottom surface of the module cabinet spaced apart from each other in a range where the at least one sweeping unit contacts the floor.

The at least one auxiliary wheel may be left-right symmetric with respect to the central vertical plane. The at least one sweeping unit may include a left sweeping unit and a right sweeping unit which are left-right symmetric with respect to the central vertical plane.

The collection driving unit may include: a sweeping motor having a motor rotation axis disposed on the central vertical plane; a sweeping shaft, both ends of which are connected to the left sweeping unit and the right sweeping unit respectively, and which is extended in a left-and-right direction; and a driving force transmission unit which transmits torque of a motor rotation axis to the sweeping shaft.

The driving force transmission unit may include: a worm gear which rotates while being fixed to the motor rotation axis; and at least one gear which rotates by being engaged with the worm gear by rotation of the worm gear. One of the at least one gear may be fixed to the sweeping shaft to rotate along with the sweeping shaft.

The collection module may be disposed in front of the mop module. The at least one sweeping unit may be disposed in front of the pair of collection units. The at least one collection unit may have an open portion at the front. And, The open portion communicates with the collection space.

The cleaner may further include: a water tank which stores water to be supplied to the mop module; and a battery which provides power. A center of gravity of the water tank and a center of gravity of the battery may be configured to be disposed on the central vertical plane. The cleaner may further include a pump which performs pumping to move water in the water tank to the mop module. A center of gravity of the pump may be configured to be disposed on the central vertical plane.

The cleaner may further include a mop driving unit or motor which provides torque to the pair of spin mops, and is left-right symmetric with respect to the central vertical plane. The collection module may be disposed in front of the mop module. A point, to which the largest frictional force is applied from the floor on a bottom surface of a left spin mop of the pair of spin mops, may be configured to be disposed on a left side of a center of rotation of the left spin mop, and a point, to which the largest frictional force is applied from the floor on a bottom surface of a right spin mop of the pair of spin mops, may be configured to be disposed on a right side of a center of rotation of the right spin mop. The center of gravity of the water tank and the center of gravity of the battery may be configured to be disposed rearward of the points of the left spin mop and the right spin mop, on which the largest frictional force is applied.

The water tank and the battery may be disposed with a vertical gap formed therebetween. The cleaner may be disposed across the gap between the water tank and the battery; and may further include a detaching assembly which operates to enable the mop module and the body to be detachably connected with each other. In the cleaner, the body may be configured to move by rotation of the pair of spin mops without a separate driving wheel.

The cleaner may further include: an image sensor which senses external images; and a controller which learns a traveling area by using the images, and controls to recognize a current position of the cleaner. The cleaner may further include a sensing module, which may include at least one of a bumper, which senses contact with an external obstacle, an obstacle sensor, which senses an external obstacle spaced apart from the cleaner, and a cliff sensor which senses presence of a cliff on a traveling surface. The cleaner may further include a controller which controls traveling of the cleaner by receiving input of a sensing signal of the sensing module.

In accordance with an aspect of the present application, there is provided a cleaner including: a mop module which may include a pair of spin mops that contacts a floor while rotating clockwise or counterclockwise when viewed from a top; a collection module which contacts the floor at a position spaced apart from the mop module in a forward and backward direction, and collects foreign substances from the floor; and a body which is supported by the mop module and the collection module.

In accordance with an aspect of the present application, there is provided a cleaner including a mop module which may include a pair of spin mops that contacts a floor while rotating clockwise or counterclockwise when viewed from a top and is left-right symmetric with a virtual central vertical plane. Further, the cleaner may include a collection module that collects foreign substances from the floor at a position spaced apart from the mop module in a forward and backward direction. The collection module may include at least one collection unit that forms a collection space which stores the collected foreign substances. The at least one collection unit is left-right symmetric with respect to the central vertical plane. In addition, the cleaner may include a body which is disposed to connect the mop module and the collection module. In addition, the cleaner may include a water tank configured to store water to be supplied to the mop module, wherein a center of gravity of the water tank is configured to be disposed on the central vertical plane. And, the cleaner may include a battery configured to provide power, wherein a center of gravity of the battery is configured to be disposed on the central vertical plane.

As described above, the cleaner may perform wiping while collecting relatively large foreign substances. Further, as the cleaner is supported by the mop module, wiping efficiency may be increased. In addition, by securing stability in the leftward and rightward movement of the cleaner using a pair of spin mops provided on the left side and the right side, with the collection module, which is spaced apart from the mop module in a forward and backward direction, contacting the floor using an auxiliary wheel, stability in the forward and backward movement of the cleaner may be increased. Specifically, with respect to a supporting point of the mop module, the collection module prevents the cleaner from overturning forward, and a rag surface of the mop module prevents the cleaner from overturning rearward.

Further, the collection module provides a frictional force for leftward and rightward vibration, thereby enabling the cleaner to move straight by the frictional force of the rag surface while traveling. Moreover, in one configuration, while securing stability in forward and backward movement and leftward and rightward movement of the cleaner, load may be distributed by applying a relatively large load on the mop module which is a supporting point for traveling. Specifically, by providing the center of gravity of the water tank and/or the center of gravity of the battery relatively at the rear side, a ratio of the load applied to the mop module to the load applied to the collection module may be increased. Further, by applying the largest frictional force to a left front side of the bottom surface of the left spin mop and to a right front side of the bottom surface of the right spin mop, a ratio of the weight of the rear side to the weight of the front side is increased with respect to a virtual axis connecting two points P1a and p1b on which the largest frictional force acts. In this case, with respect to the entire load of the cleaner, a ratio of the load applied to the mop module to the load applied to the collection module is increased, thereby increasing efficiency of wiping and traveling according to rotation of the mop module.

The auxiliary wheel is provided to enable the floor and the bottom surface of the module cabinet to be spaced apart from each other in a range where the pair of sweeping units may contact the floor, a frictional force between the collection module and the floor may be reduced while the cleaner travels, the cleaner may be prevented from overturning forward and backward, and the sweeping unit may sweep the floor at a predetermined height.

Further, the pair of collection units, which collect foreign substances, are left-right symmetric with respect to the virtual central vertical plane, which is a reference plane based on which the pair of spin mops are left-right symmetric, such that accurate traveling control may be provided by the pair of left and right spin mops, and unexpected eccentric movement may be prevented. In addition, with respect to the central vertical plane, the pair of sweeping units, the at least one auxiliary wheel, the mop driving units and/or the collection driving units are left-right symmetric, thereby enabling accurate traveling control.

Moreover, the center of gravity of the water tank, the battery and/or the pump is disposed on the central vertical plane, thereby enabling accurate traveling control. Further, the collection driving part, which includes a motor rotation axis disposed on the central vertical plane, is provided in a manner that enables the collection driving part to be left-right symmetric with respect to the central vertical plane. The pair of collection units and the pair of sweeping units each have a gap therebetween, such that the collection driving part may be disposed on the central vertical plane, and may be left-right symmetric. The collection module is disposed in front of the mop module, and the pair of sweeping units is disposed in front of the pair of collection units. In this manner, after foreign substances are first swept up from the floor at the front side, wiping is performed following the swept floor, thereby enabling efficient cleaning.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present application.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the application. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this application belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the application. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cleaner comprising:
 a mop module which includes a pair of spin mops that contact a floor while rotating and are left-right symmetric with respect to a virtual central vertical plane;
 a collection module that collects foreign substances from the floor and is spaced apart from the mop module, the collection module including:
  at least one collection bin that forms a collection space which stores the collected foreign substances and is left-right symmetric with respect to the central vertical plane, and
  at least one sweeping roller which contacts the floor while rotating to move foreign substances from the floor into the collection space and is left-right symmetric with respect to the central vertical plane;
 a body which connects the mop module and the collection module; and
 a collection driving motor which provides torque to the at least one sweeping roller and is left-right symmetric with respect to the central vertical plane.

2. The cleaner of claim 1, wherein the collection module further includes:
 a module cabinet having a bottom surface facing the floor; and
 at least one auxiliary wheel that spaces the floor and the bottom surface of the module cabinet apart from each other at a distance to positioned the at least one sweeping unit to contact the floor.

3. The cleaner of claim 2, wherein the at least one auxiliary wheel is left-right symmetric with respect to the central vertical plane.

4. The cleaner of claim 1, wherein the at least one sweeping roller includes a left sweeping roller and a right sweeping roller which are left-right symmetric with respect to the central vertical plane.

5. The cleaner of claim 4, wherein the collection driving motor has a motor rotation axis positioned on the central vertical plane, and wherein the cleaner further comprises:
a sweeping shaft, both ends of which are connected to the left sweeping roller and the right sweeping roller respectively, and which extends in a left-and-right direction; and
a driving force transmission gearing which transmits torque of the motor rotation axis to the sweeping shaft.

6. The cleaner of claim 5, wherein the driving force transmission gearing includes:
a worm gear which rotates while being fixed to the motor rotation axis; and
at least one gear which engages the worm gear and rotates based on a rotation of the worm gear,
wherein one of the at least one gear is fixed to the sweeping shaft to rotate along with the sweeping shaft.

7. The cleaner of claim 1, wherein:
the collection module is provided in front of the mop module;
the at least one sweeping roller is positioned in front of the at least one collection bin; and
the at least one collection bin has a front portion with an opening communicating with the collection space.

8. The cleaner of claim 1, further comprising:
a water tank which stores water to be supplied to the mop module; and
a battery which provides power,
wherein a center of gravity of the water tank and a center of gravity of the battery are positioned on the central vertical plane.

9. The cleaner of claim 8, further comprising a pump which moves water in the water tank to the mop module,
wherein a center of gravity of the pump is positioned on the central vertical plane.

10. The cleaner of claim 8, further comprising a mop motor which provides torque to the pair of spin mops, and is left-right symmetric with respect to the central vertical plane.

11. The cleaner of claim 8, wherein:
the collection module is positioned in front of the mop module,
a portion of the left spin mop where a largest frictional force is applied from the floor on a bottom surface of a left spin mop of the pair of spin mops, is located at a left side of a center of rotation of the left spin mop,
a portion of the right spin mop where a largest frictional force is applied from the floor on a bottom surface of a right spin mop of the pair of spin mops, is located at a right side of a center of rotation of the right spin mop, and
the center of gravity of the water tank and the center of gravity of the battery are positioned rearward of the portions of the left spin mop and the right spin mop where the largest frictional forces is applied.

12. The cleaner of claim 1, wherein the body moves based on a rotation of the pair of spin mops and without a separate driving wheel.

13. The cleaner of claim 1, further comprising:
an image sensor which captures external images; and
a controller that maps a traveling area based on the images, and determines a current position of the cleaner in the travelling area.

14. The cleaner of claim 1, further comprising:
a sensor including at least one of a bumper which detects contact with an external obstacle, an obstacle sensor which detects an external obstacle spaced apart from the cleaner, or a cliff sensor which detects a cliff on a traveling surface; and
a controller which manages a rotation of the spinning mops to control a movement of the cleaner based on information detected by the sensor.

15. A cleaner comprising:
a body;
a mop module coupled to the body, the mop module including spin mops that contact a floor while rotating and having a center of mass on a virtual central vertical plane;
a water tank that stores water to be supplied to the mop module, a center of mass of the water tank being positioned on the virtual central vertical plane; and
a battery that provide powers to the cleaner and having a center of mass that is positioned on the central vertical plane.

16. The cleaner of claim 15, further comprising:
a collection module that collects foreign substances on the floor and is spaced apart from the mop module in a forward and backward direction, the collection module including at least one collection bin that stores the collected foreign substances and having a center of mass on the virtual central vertical plane,
wherein the body connects the mop module and the collection module.

17. The cleaner of claim 16, wherein the collection module further includes:
at least one sweeping roller which contacts the floor while rotating to move the foreign substances from the floor into the collection bin and having a center of mass on the virtual central vertical plane; and
a collection driving motor which provides torque to the at least one sweeping roller and having a center of mass on the virtual central vertical plane.

18. The cleaner of claim 17, wherein:
the collection module is provided in front of the mop module;
the at least one sweeping roller is positioned in front of the at least one collection bin;
the at least one collection bin has an open front wall facing the at least one sweeping roller to receive the foreign substances from the floor; and
the cleaner further comprises a collection driving motor which provides torque to the at least one sweeping roller and having a center of mass on the virtual central vertical plane.

19. The cleaner of claim 17, wherein the at least one sweeping roller includes a left sweeping roller and a right sweeping roller which are left-right symmetric with respect to the central vertical plane.

20. The cleaner of claim 17, further comprising a mop motor which provides torque to the spinning mops and has a center of mass on the virtual central vertical plane.

* * * * *